(12) United States Patent
Carlow

(10) Patent No.: US 6,474,604 B1
(45) Date of Patent: Nov. 5, 2002

(54) MOBIUS-LIKE JOINING STRUCTURE FOR FLUID DYNAMIC FOILS

(76) Inventor: Jerry E. Carlow, 3307 Stoney Cluster, San Antonio, TX (US) 78247

( * ) Notice: Subject to any disclaimer, the term of this patent is extended or adjusted under 35 U.S.C. 154(b) by 0 days.

(21) Appl. No.: 09/548,020

(22) Filed: Apr. 12, 2000

Related U.S. Application Data

(60) Provisional application No. 60/128,744, filed on Apr. 12, 1999.

(51) Int. Cl.$^7$ ................................................ B64C 3/58
(52) U.S. Cl. ...................... 244/199; 244/45 R; 244/130
(58) Field of Search .................................. 244/198, 199, 244/91, 45 R, 45 A, 130, 34 R, 35 R; 416/242, 228

(56) References Cited

U.S. PATENT DOCUMENTS

| | | |
|---|---|---|
| 1,939,682 A | 12/1933 | Fleming |
| 2,461,805 A | 2/1949 | Barker |
| 2,576,294 A | 11/1951 | Geraci |
| 2,576,981 A | 12/1951 | Vogt |
| 2,743,888 A | 5/1956 | Lippisch |
| 2,915,261 A | 12/1959 | Wallis |
| 2,984,439 A | 5/1961 | Fletcher |
| 3,270,988 A | 9/1966 | Cone |
| 3,712,564 A | 1/1973 | Rethorst |
| 3,780,969 A | 12/1973 | Nussbaum et al. |
| 3,831,885 A | 8/1974 | Kasper |
| 3,834,654 A | 9/1974 | Miranda |
| 3,845,918 A | 11/1974 | White |
| 3,981,460 A | 9/1976 | Ratony |
| 3,985,317 A | 10/1976 | Geraci et al. |
| 4,053,125 A | 10/1977 | Ratony |
| 4,090,681 A | 5/1978 | Zimmer |
| 4,146,199 A | 3/1979 | Wenzel |
| 4,190,219 A | 2/1980 | Hackett |
| 4,365,773 A | 12/1982 | Wolkovitch |
| 4,541,593 A * | 9/1985 | Cabrol ...................... 244/45 R |
| D292,203 S * | 10/1987 | Ligeti ......................... D12/319 |
| 5,102,068 A | 4/1992 | Gratzer |
| 5,405,243 A | 4/1995 | Harley et al. |
| 5,899,409 A * | 5/1999 | Frediani ................... 244/45 R |

FOREIGN PATENT DOCUMENTS

FR 726674 * 6/1932 .................. 244/199

OTHER PUBLICATIONS

Proctor, Paul, "Winglet Designs to Cut Fuel Burn," *Aviation Week & Space Technology*, Dec. 6, 1993, p. 49.
http://www.lmasc.com/status.htm, Feb. 11, 2000.
Dane, Abe, "Diamond Eyes", *Popular Mechanics*, Sep. 1993, p. 30–33, 105.
Stover, Dawn, "Wing Tip Dynamos Spin Out Extra Power," *Popular Mechanics*, Sep. 1987, p. 65.

* cited by examiner

Primary Examiner—Galen L. Barefoot

(57) ABSTRACT

This invention, though preferably applied to aircraft structure, has application to foil-bearing devices in general, creating structure somewhat similar to the structure of a mobius band surface which characteristically rejoins to itself, because said structure produces unique continuity of one surface blending into a subsequent one, said structure most often having opposed higher and lower pressure-dynamic surfaces. These "mobius-like" structures join foil segments and complementary surfaces to specific fluid-dynamic components (foil segments joined to foil extensions, shaped and contoured panels, subsequent foil segments, and moveable surfaces) such that there is particular unique continuity of a first fluid-dynamic component to a subsequent one thus more effectively utilizing foil-created fluid-dynamic pressure flow for orchestrated lift and thrust production and reducing vortex-induced fluid-dynamic drag than have other inventions of the prior art.

20 Claims, 18 Drawing Sheets

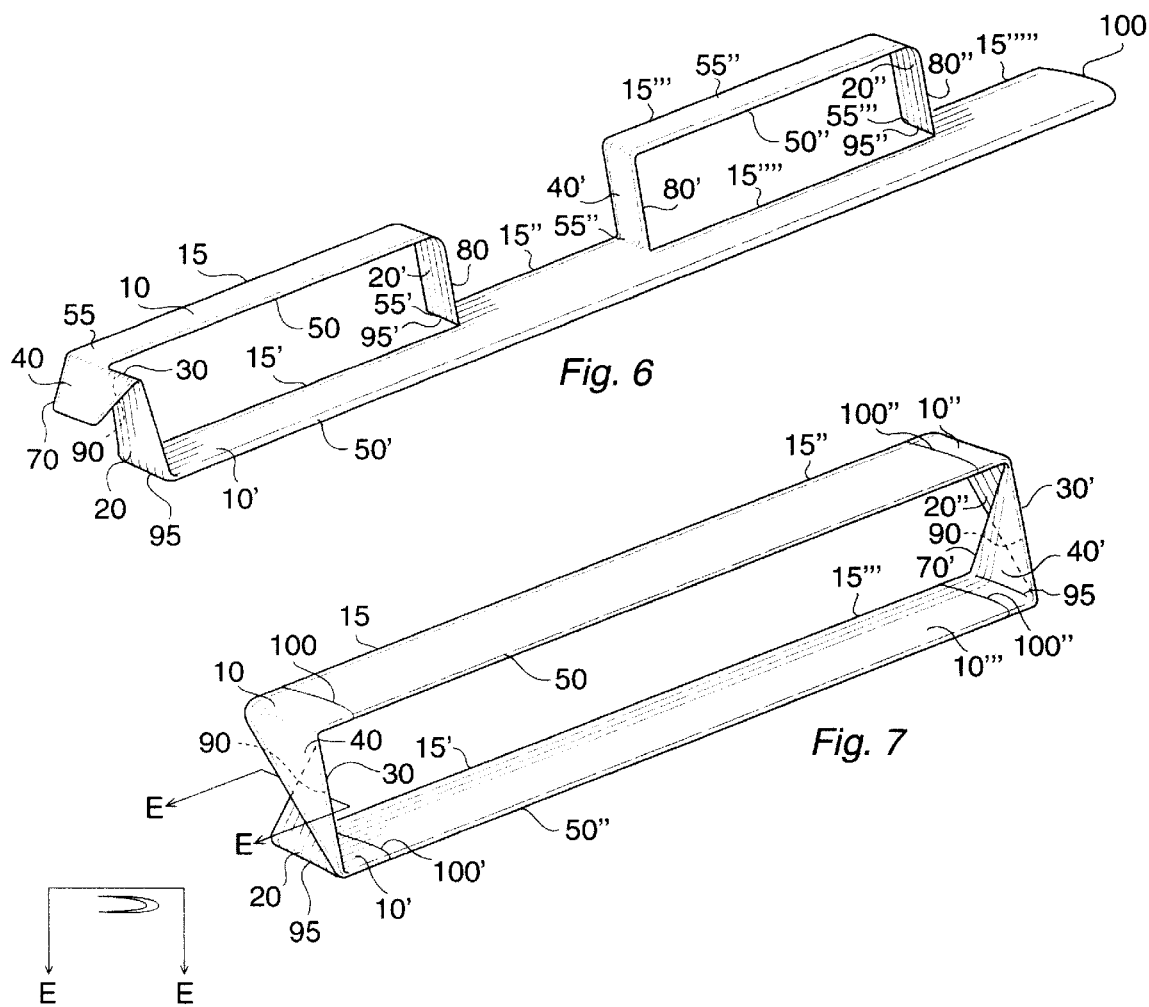

Figure 1:
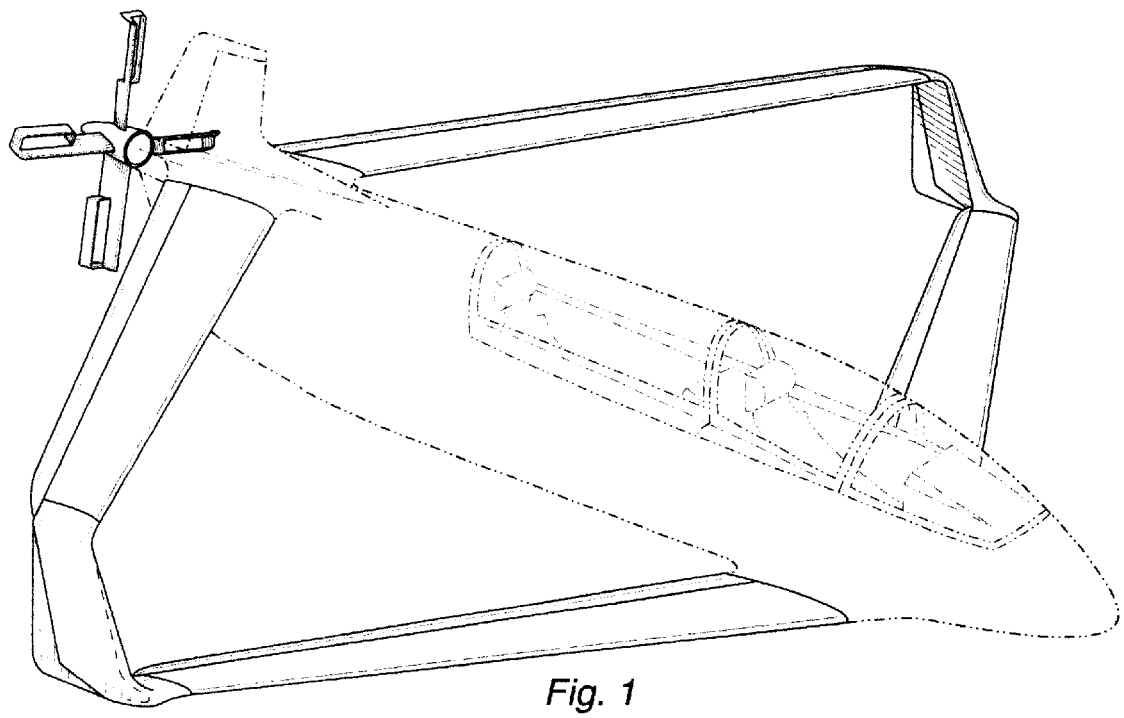

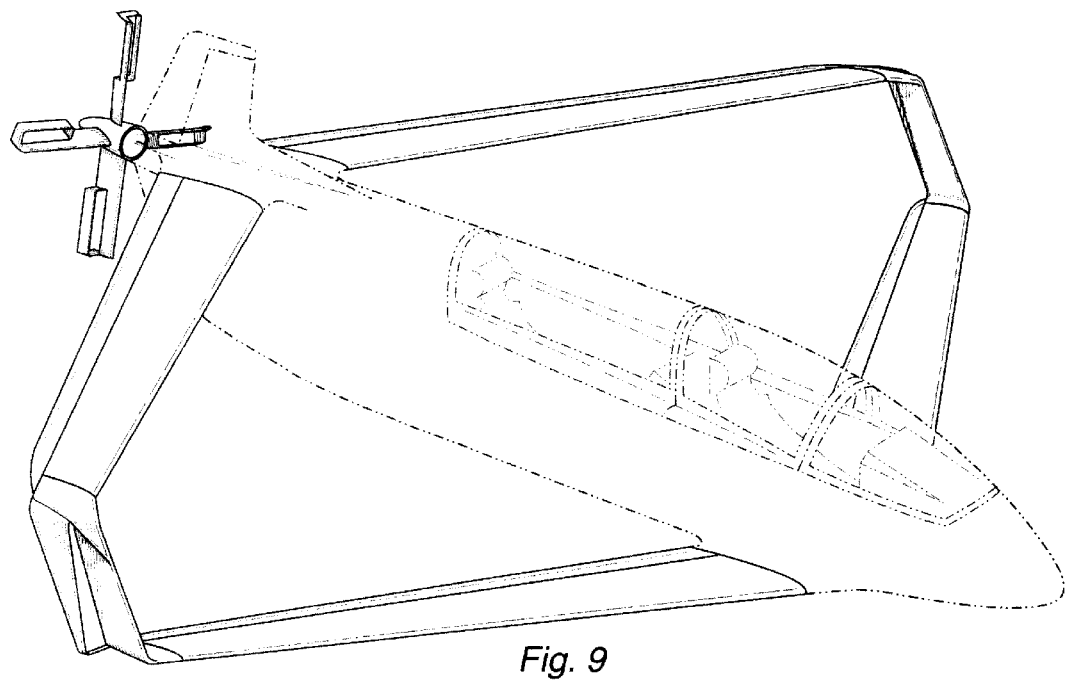
Fig. 9
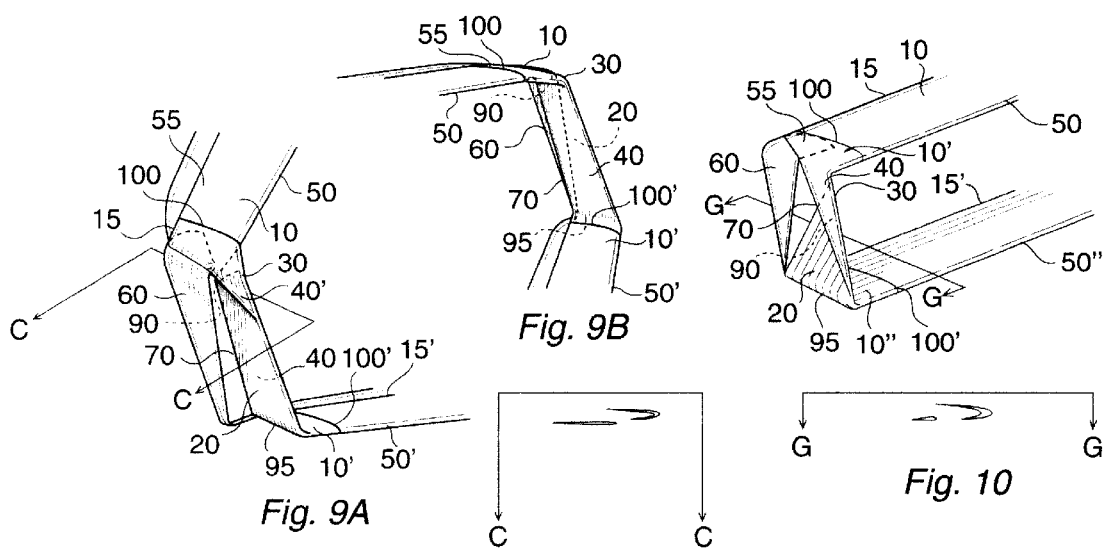
Fig. 9A
Fig. 9B
Fig. 10
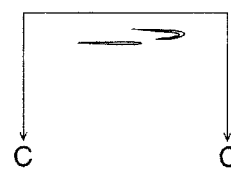

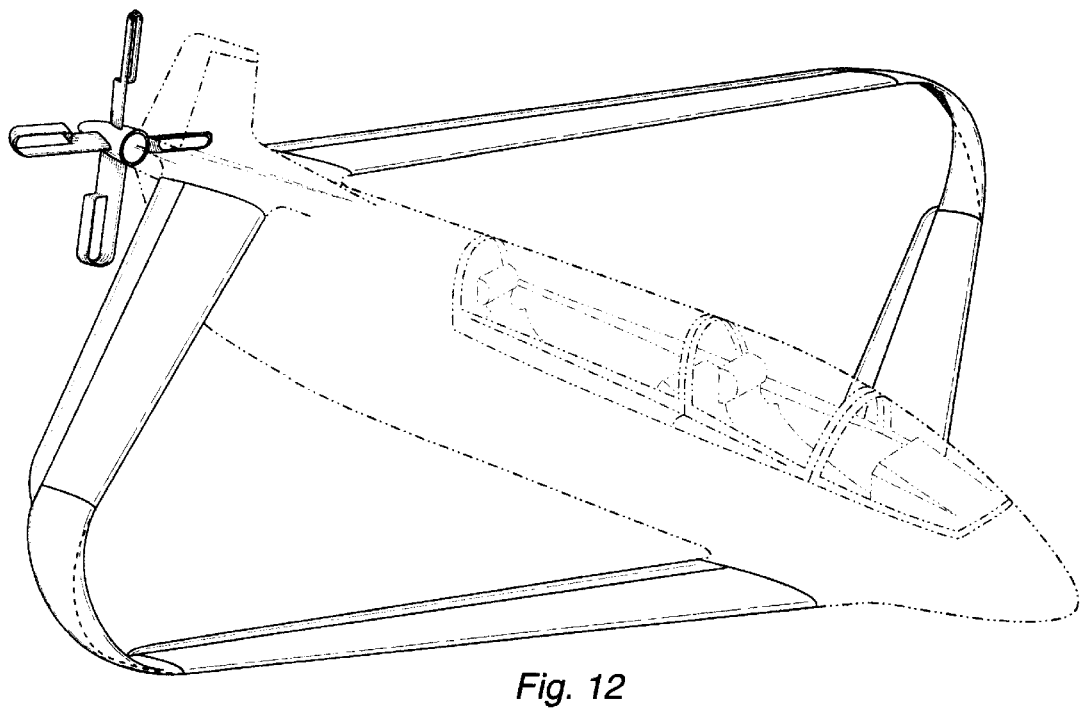
Fig. 12
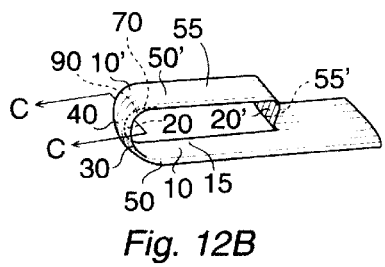
Fig. 12B
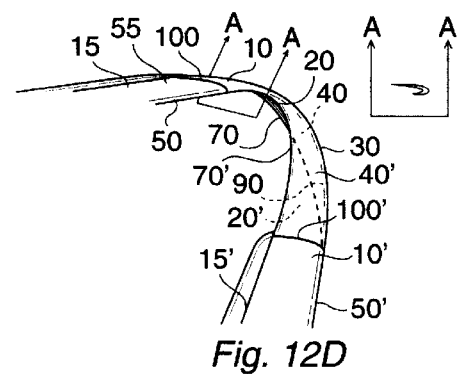
Fig. 12C
Fig. 12D

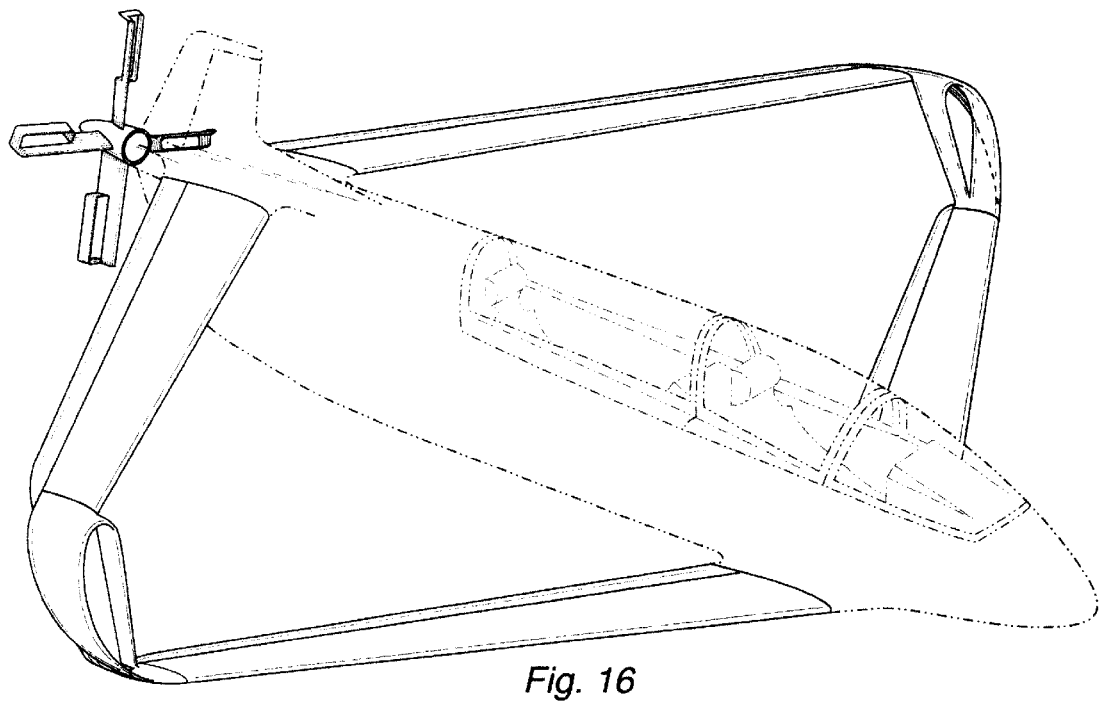
Fig. 16
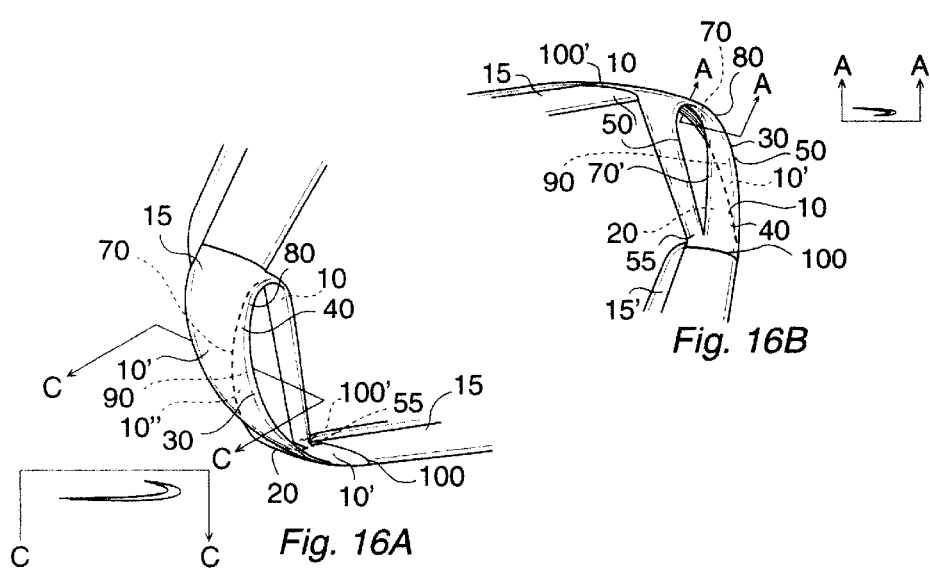
Fig. 16A
Fig. 16B

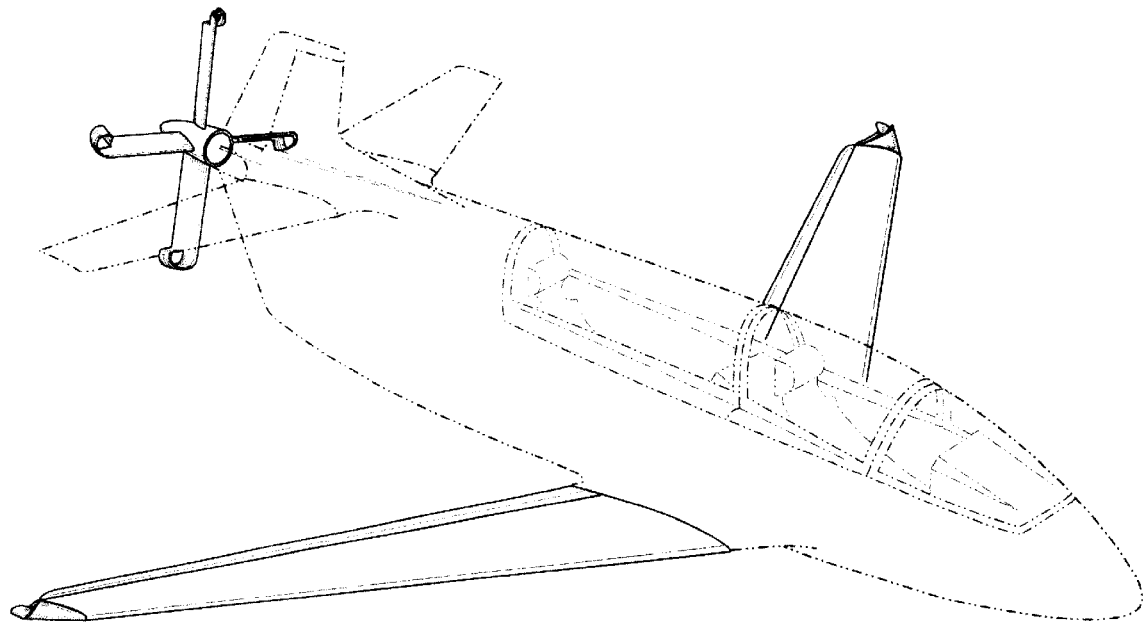
*Fig. 17*
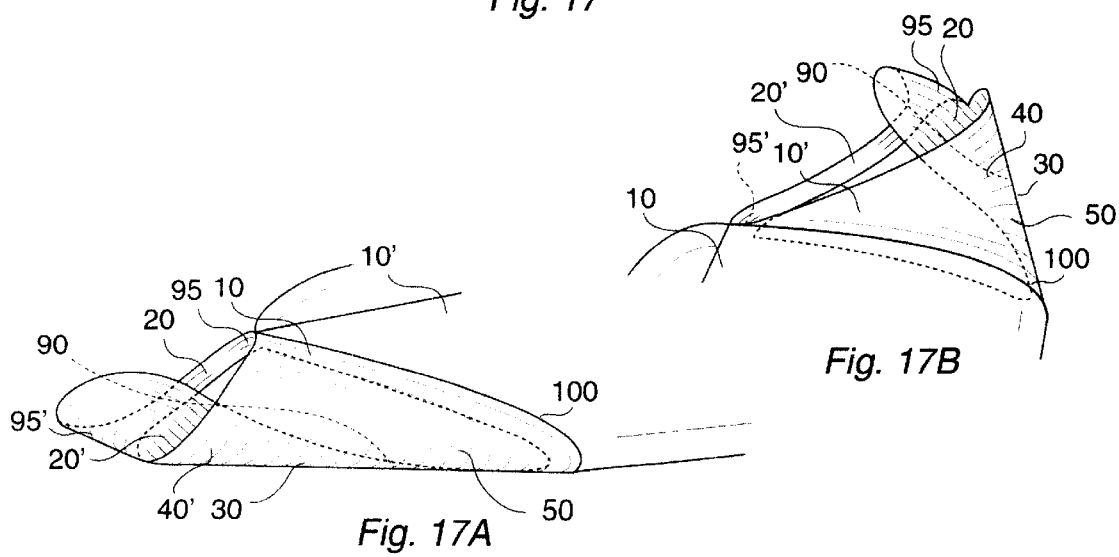
*Fig. 17B*
*Fig. 17A*

MOBIUS-LIKE JOINING STRUCTURE FOR FLUID DYNAMIC FOILS

This application claims the benefit of U.S. Provisional Application No. 60/128,744, filed Apr. 12, 1999.

BACKGROUND OF THE INVENTION

1. Field of the Invention

This invention relates in general to certain new and useful improvements in fluid-dynamic efficiency of wings and fluid-dynamic foils which are employed in dual or multiple foil structures or in joined segments of foils that are split into segments and rejoined.

2. Description of the Prior Art

Airfoil shapes and foils moving through a fluid produce pressure differential as roughly defined by the term "lift". By producing pressure differential, a pattern of circulation is produced around the advancing foil. This circulation is continuous around the length of the foil and is known as a "vortex", or "vortical flow". This vortex remains "bound" around a conventional airfoil the length of the surface from root to the tip. The same phenomenon occurs with all fluid foils creating pressure differentials similar to lift. Beyond the tip of conventional fluid foils this rotating fluid circulation "sheds" off into tornado-like "free" vortices or, in the case of aircraft a trailing "wingtip vortex." Each shed vortex tends to grow into a tighter and more compact rotating fluid mass as it leaves each tip surface into the "free stream" because the differential in pressures (lower pressure from the upper side of the foil and higher pressure from the opposite side of the foil) are attempting to equalize. The vortex, with its high-pressure outer layers rotating rapidly, draws the high-pressure component into its lower pressure core. This suction-creating effect produces undesirable lift-induced drag. The pair of shed tip vortices typically trailing behind conventional aircraft exemplifies this. When in flight, small vortices also shed from the trailing edge of conventional aircraft wings, but the primary drag-inducing vortices are those shed at the outer wingtips. These vortices contain tremendous quantities of rotating mass fluid-dynamic energy.

Long tornado-like rotating vortices behind large aircraft may continue for hundreds of feet or even miles, depending upon the weight of the aircraft, wing area, aspect ratio, and other variable factors. In some cases these vortices endanger other aircraft that may be entering the wake of these energy-laden vortices trailing the aircraft. It becomes obvious that trailing vortices in addition to creating tremendous amounts of fluid-dynamic drag also can be hazardous to pilots and passengers flying small aircraft where larger aircraft are departing and arriving.

Reducing induced drag results directly in decreasing the amount of energy required to sustain fluid-dynamic foil induced lift The purpose of all attempts to reduce drag is energy conservation of one form or another. Some inventors have sought to reduce induced vortice-created drag in aircraft by use of such devices as end plates, winglets at wing tips, propellers with winglet-like projections at the blade tips. Some inventors have sought to improve aerodynamic efficiency by using joined wing systems on conventional fuselages. Joined wings have inherent rigidity and some fluid-dynamic advantage over conventional wings, but there are inherent inefficiencies in prior art joined wing systems in that they do not employ devices that would eliminate or greatly reduce the drag penalty from vortex-induced drag. Up to ½ or more of all induced drag of conventional wings is due to "vortex shedding"—the resulting creation of free vortices from fluid-dynamic foils in the process of producing lift.

Most the multi-wing creations of previous inventors have not reached the maximum potential of aerodynamic efficiency and drag reduction. In spite of the positive (theoretically and experientially demonstrated) potential of joined wing aircraft to reduce induced drag, most joined wing aircraft have wing intersections that unfavorably translate wing tip pressures from the leading wing to the following wing. Forward placed airfoils are commonly joined to aft ones such that vortice translation creates oppositional interference when translated pressure mass from the first airfoil interfaces with counter-rotating circulation mass of the subsequent foil. One advantage of structurally joining wingtips is a shorter, yet stronger span for the same amount of wing area. Decreased wing length results in decreased bending moments. When a wingtip union is properly designed to translate the circulating fluid mass without letting it shed as a vortex, it can also be designed to utilize this potential energy for forward thrust and lift augmentation to the rear lifting surfaces (in a joined wing, biplane system or multilayered wing arrangement). The ideal wing system would reduce overall induced drag rather than creating unwanted induced vortex drag. Utilizing such an invention would enable a designer to significantly reduce wing area because the wing system is producing more lift per square area unit. Reducing wing area also means less profile drag and the amount of energy necessary to sustain forward flight is greatly decreased. The ultimate improvement of aerodynamic or fluid dynamic foils would be to eliminate practically all foil-tip vortex-induced drag by translating this fluid-dynamic flow from a leading foil pair to corresponding surfaces of subsequent foils behind said leading foil pair, or to convert this vortical energy into forward thrust, or both. The ultimate increase in efficiency would result from utilizing inventions which eliminate the greater percentage of all wingtip vortex-induced drag, thus the effect of "infinite" wing is more nearly realized without the more extensive structure and subsequent weight penalty resulting from strengthening and lengthening wings to a high aspect ratio.

THE PRIOR ART

Vortex shedding at the wingtips is a performance liability for conventional aircraft: Shedding wingtip vortices produce ½ or more of the total induced drag of lifting airfoils (wings and propeller blades). Shedding vortices are what causes increased noise from rotating blades and propellers. Inventions such as the "Q-Tip" propeller modify shedding vortices to minimize noise produced at the tips. Other inventions have been created for use on conventional aircraft wingtips and propellers to reduce drag and utilize the dynamic energy contained in these vortices. Such inventions reduce the drag-producing component by "diffusing" or "dissipating" or "suppressing" these vortices. "Whitecomb Winglets" or Hachett's Vortex Diffuser (U.S. Pat. No. 4,190,219) were each designed to disperse the vortex somewhat and also convert vortical energy into forward thrust. Small winglets such as these can improve wing efficiency somewhere near 15%. Most devices that are designed for conventional wings to disperse, reduce, or utilize tip vortice dynamic pressures function with varying, but limited degrees of efficiency in drag reduction. Previous attempts to significantly reduce drag due to vortex shedding have produced limited degrees of success.

Methods of modifying the wingtip vortex formed at the outer tips of airfoils have included the use of end plates to reduce vortex shedding and multiple vanes to "split", "diffuse" or weaken the vortex, thus lessening vortex-induced drag. Attached panels and upward or downward turned tips have been used with varying degrees of success to present. Some inventions break larger vortices down into multiple smaller vortices to lessen vortex-induced drag, thus not allowing a single trailing vortex to form off each wingtip. Such devices are attempts to reduce kinetic energy in the wake of the wing, and consequently lessen induced drag. Richard Vogt (1951, U.S. Pat. No. 2,576,981), Alexander Lippish (1956 U.S. Pat. No. 2,743,888), Clarence C. Cone, Jr. (1966 U.S. Pat. No. 3,270,988), and Scott Rethorst (1973 U.S. Pat. No. 3,712,564) each invented wingtip devices to diminish vortex-induced drag in aircraft. Nonetheless, such attempts have produced only limited improvement in induced drag reduction.

Dr. Richard T. Whitcomb of NASA (inventor/developer of the "VWhitcomb Winglet") in his presentation of CONCEPTS FOR DRAG REDUCTION OF AGARD/VKI outlined the problem and suggested solutions and objectives in the section entitled "Methods for Reducing Subsonic Drag Due to Lift." To utilize more effective methods of vortex-induced drag reduction and improve wing efficiency has been the objective of certain inventors who perceive that joined wing systems could be more efficient, could have better structural strength-to-weight ratio, and could provide better crash protection for passengers and pilot. Such aircraft employ dual airfoils (i.e. forward and aft pairs of wings) joined structurally such that united members ideally create little or no aerodynamic interference or even contribute to aerodynamic function by use of control surfaces, with unions that add rigidity and strength to the wing structure. Without additional special structure that changes fluid dynamic flow characteristics, joined wing systems produce only marginal drag reduction results.

Geraci (U.S. Pat. No. 2,576,294) showed a box plane configuration. Outer wingtip unions are curved such that the vortical flow of the primary wing continues outward and up to the second. The primary wing's lift-induced vortical flow is directionally opposite to the normal pattern of vortical flow around the second wing. Both wings are swept the same direction and joined such that lower surface of the first wing transitions to upper surface of the second wing and the bottom of the first continues into the top of the second. Because interfacing lift-induced bound vortices of each adjacent wing pair rotate directionally opposite, unfavorable interference is produced. Geraci's invention included a joined blade propeller which functions in a manner similar to joined wing systems, but this joined blade propeller suffered the same limitations inherent in conventional unmodified joined wing systems.

Zimmer (U.S. Pat. No. 4,090,681) utilizes two sets of wings forming a closed frame. All wings are rearward swept. The aft set of wings attaches to the fuselage at a lower level than front wings. The vertical fin does not support the wing. Wings are joined at the outer tips of each adjacent pair either by a flat plate or small rounded tip. There is no provision for optimizing the fluid-dynamic flow such that formed vortices are minimized or eliminated.

Ratony (U.S. Pat. No. 3,981,460) discloses an aircraft with swept back and swept forward wings that form a closed triangle or "diamond" shaped frame in front elevation view. The wing is essentially a continuous loop and is supported at the roots only. In a second patent, Ratony (U.S. Pat. No. 4,053,125) shows fore and aft wing pairs joined at the tips either with a tank-like tip or a curved continuation of the first wing's upper surface into the correspondingly opposite (i.e. the bottom) of the second. The surfaces are not linked corresponding surface to corresponding surface. Wings overlap somewhat producing greater than normal potential for fluid-dynamic interference and vortex shedding.

Miranda (U.S. Pat. No. 3,834,654) discloses an aircraft that uses forward swept rear wings and rearward swept forward wings that are connected by vertical panels forming a rectangular box configuration. Structural stiffness against side forces is limited in that it has no diagonal members. The vortical flow components of either forward foil of the pair would tend to create interference with the vortical flow component of each corresponding aft-located foil. Each said aft located foil is attached inboard at a location higher on the fuselage than said forward foil is attached. The vortical circulation produced by said forward foil would move upward and outboard, rotating around said forward foil from the root of said foil to the outer foil tips and around the vertical panel until it interfered with the lift-induced oppositely rotating vortical flow of said aft located foil. The counterrotating vortices produced interfere with each other. The result is disadvantageous lift-neutralizing effects on aircraft configured with this version of a joined wing system.

Wenzel (U.S. Pat. No. 4,146,199) demonstrates an aircraft comprised of an unconventional lifting fuselage having flat panel sides to which two wing pairs are attached. The rear wings are swept forward at negative dihedral, and the forward wings are swept rearward, each wing joining its adjacent neighbor wing at the tip. These wings are joined by a curved surface, somewhat horseshoe shaped in front or rear elevation view. As with the Miranda and Geraci designs, the outward travelling bound vortex of the front wing continues circulating around the wingtip union outward to finally interfere with the normal rotational direction of the lift-induced bound vortex circulating around the second wing.

Joined wing systems using any of the above-described techniques of fuselage attachment can be adapted to many existing aircraft with simple modifications and strengthening of structural members. The practical technology for development of joined wing aircraft is currently established in practice by NASA and by inventors who have contributed significantly to this technology, but the problem of successfully eliminating major amounts of vortex-induced drag has not been well resolved in previous inventions. What had been needed is a complement to the prior art that would resolve long-standing problems of vortex-induced drag and fluid-dynamic inefficiency inherent in fluid-dynamic systems. The problem of fluid-dynamic inefficiency and thus prevention of energy loss from fluid-dynamic drag has been only partially addressed by practitioners of the prior art.

SUMMARY OF THE INVENTION

This invention consists of joining adjacent fluid-dynamic foil segments by using mobius-like structures or segments of somewhat mobius-like elements to unite said adjacent fluid-dynamic foil segments so that there is a continuity of first fluid-dynamic foil surface into the corresponding subsequent fluid-dynamic foil surface.

When joining a first foil segment to a subsequent foil segment the top surface of said first foil segment is continuously joined to top surface of said subsequent foil segment and the bottom surface of said first foil segment is continuously joined to the bottom surface of said subsequent foil segment. These continuously joined surfaces translate vortical fluid-dynamic pressure flow from the first surface to subsequent surfaces such that major "free" vortices are inhibited from forming at the outer tips of said first foil. The pressure-dynamic flow of the "bound" vortex circulating around said first foil can be thus translated by means of the moblus-like structure or segment of mobius-like structure to said subsequent foil surface. Said translated fluid-dynamic pressure flow tends to favorably intercept and instead of contradict, actually complement or augment the lift-induced circulating pressure-dynamic vortex bound around said subsequent foil surface. Some of this bound vortical energy may be converted to forward thrust by calculated arrangement of specific elements of this invention. The union between said first foil's outer tip and said subsequent foil's outer tip can be curved, twisted, bent, or canted for maximized induced drag reduction as needed for specific application and to meet the aesthetic requirements of the particular design being created or a unit can be retrofitted to an existing foil/body arrangement by developing the particular shape of mobius-like structure necessary for both complementing the particular design and achieving the specific fluid-dynamic effect and specific efficiency desired.

By maintaining continuity of cambered forward wing surface joined to corresponding rear wing cambered surface, this invention inhibits "vortex interference" and "shedding". As rudders, wings and elevators vary in shape, size, dihedral and thickness for structural, performance, or sometimes for aesthetic reasons, likewise variations in the appearance of this invention will manifest for the same reasons. Though different in appearance, each variation is fundamentally the same method of uniting foil surface to foil surface with one principle mode of function exclusive to the invention. While the principles of the invention is made clear in illustrative embodiment, it will become immediately obvious to those skilled in the art that many modifications of structure, arrangement, proportions, elements, materials, and components used in the practice of this invention can be particularly adopted for specific environments and operating requirements without departing from the principles of its operation and arrangement. It will be obvious to those skilled in the art that many modifications may be made within the scope of the present invention without departing from the spirit thereof, and the invention includes all such modifications.

The effect of using this method of utilizing moblus-like unions or segments of mobius-like structure for joining adjacent wings or fluid-dynamic foils is to produce one continuous vortical circulation pattern that does not shed into the free stream but instead stays in circulation from the first foil toward the tip, transitioning across the tip union and around the subsequent foil without the typical occurrence of vortices shedding into the freestream. When applied to aircraft structures using the joined wing system for example, the fuselage or rudder acts upon said circulation pattern as would a final end plate on a wingtip and does not allow this return fluid-dynamic flow to shed as a tip vortice. In effect this structure acts more closely like aerodynamic theory's description of an ideal no-induced-drag "infinite wing" than does a conventional or joined wing in spite of limited span of low aspect ratio.

Classical aerodynamic theory postulates that an infinitely long wing would produce absolutely no induced drag. Comparing the lift to drag (L/D) ratios of long-winged "high aspect ratio" gliders with shorter winged craft having the same wing area but using smaller aspect ratio wings upholds the validity of this theory: Long, high aspect ratio foils produce less induced drag than shorter low aspect ratio ones. There is proportionally less vortex shedding on a high aspect ratio foil than on a low aspect ratio foil. One can infer that reducing or eliminating the production of free vortices created by lifting foils would greatly enhance fluid-dynamic efficiency of a set of fluid-dynamic foils. The effect of this invention in diminishing vortex shedding would be similar to the effect of increasing the aspect ratio of a wing without the normal problem of incurring major weight penalty by adding sufficient structure necessary to strengthen and stiffening an extended, more efficient wing.

Application of said invention would demonstrate function that is more fluid-dynamically efficient and more useable than existing systems. Said invention can be integrated into existing foil systems and designed compatible to particular shapes with function in mind, but also proportioned in harmony with an eye toward aesthetic appeal which is a realistic necessity for marketing a product or modification of an existing design. Said unions should appear "integrated" with a specific aircraft design without changing the fundamental pressure translating function of said invention. Unions described herein should be adaptable to change of shape, proportion, arrangement, and combination in tandem or multiples. They should maintain integrity of function according to specific principles of operation described herein even if said union's proportions are changed to aesthetically and functionally suit a particular aircraft configuration to which it is applied. Said invention's universal application demands that it must be adaptable to rearrangement of elements and change of materials and components without departing from a principle mode of operation—whether employed singly or as multiples in tandem, and can therefore appear quite different in different applications, yet it will be the same invention operating according to said principle mode of operation, i.e. the favorable translation of fluid-dynamic flow from one foil segment to a subsequent foil segment by means of using said mobius-like structures or said segments of mobius-like structure to unite adjacent foils.

Said invention described herein uniquely complements the prior art and related inventions. Said invention can be directly adapted to most joined wing systems, similarly arranged propellers, and fluid-dynamic devices configured to utilize said principle mode of operation. The result is greatly improved fluid-dynamic foil efficiency and reduction of induced drag.

Properly utilizing vortical energy potential available at the outer tip of a lifting foil system produces these results: minimal induced drag, positive vortical translation, extraction of forward thrust from differential pressure flow, and efficient translation of directionally-correct vortical circulation around the wing. The advantages for aircraft are: the effect of high aspect ratio wings using shorter wing-spans, less structural weight, greater wing stiffness, and greater compactness. By utilizing panels that unite one or more foil segments to another (i.e. when using more than two foils, uniting the subsequent foil and the next subsequent, etc.), a more efficient path for vortical flow transition is formed. This can be accomplished by arranging panels such that they give the appearance of being doubled over or bent. These panels unite two or more foil segments so that corresponding opposite surfaces of both foils are continuously united such that upper surface of the first foil segment transitions into upper surface of the subsequent foil segment, and opposite surface of said first foil transitions into opposite surface of said subsequent foil segment. These panels which unite foils can be molded, constructed, or shaped to be efficient, strong and aesthetically balanced. Specific portions of these panels with a shape that appears doubled over result in a load-bearing union that favorably translates vortical flow from a primary foil to one or more successive ones. This invention is meant to be used as a universal upgrade for specific wing systems, greatly improving the efficiency of its operation, resulting in energy conservation.

It is intended that this invention be integrated with existing configurations either during manufacture or as accessory retrofit. By varying proportion and combination of elements without departing from the basic function and spirit of the invention, it can be integrated into different aircraft designs to maximize efficiency and maintain style continuity.

This invention's potential application goes beyond "joined wing" aircraft. When properly configured for each specific application, singly, in tandem, or in multiples, it can greatly improve efficient operation of varying aircraft such as biplanes with joined wingtips, joined tip canard systems and aircraft having rear tail planes joined to wingtips.

This invention relates to aircraft specifically and in general to all similar fluid-dynamic devices that create lift or thrust by use of one or multiple foils. Application of the moblus-like union of foils is not limited to aerodynamics, but as well to other fluid-dynamic devices such as hydrofoils and fluid-dynamic blades or rotary blade systems that extract energy from or add energy to the fluid medium they traverse—which is the essence of fluid-dynamic interraction between foils and fluid mediums.

One potential for application is in use with rotary wings such as those found in helicopters. A set of rotating foils typically used on a helicopter has blades which are essentially lift and thrust producing foils which rather than remain fixed on a fuselage, instead rotate about an axis, but still function as foils producing lift. In practice such foil sets can be correctly defined by observing their principle mode of operation. Rather than being something other than foils that are simply wings or foils that are just propellers or foils that are only rotary wings, in essence all wings, rotary wings, or propellers are the same entity. They are simply lifting foils operating in various attitudes and with different applications, using the same principle mode of operation. Some craft have rotary wings that once in flight are transitioned from horizontal to vertical orientation, suddenly becoming propellers rather than as formerly, rotary wings, until there is reversion to previous attitude for landing. These foil sets have not changed in function, structure, or mode of operation other than orientation in space producing forward thrust rather than lift. Forward thrust created by blades is in essence simply horizontally applied lift. The terms thrust and lift by popular definition are considered dissimilar, but as applied to fluid-dynamic foils in practice and observation, they are identical except that propellers are applied in roughly a horizontal plane, creating horizontal lift while spiraling through the fluid medium in which they operate. Wings likewise operate in roughly a horizontal plane, do not spiral but utilizing fluid-dynamic flow over foil surfaces create upward lift while travelling in a linear direction. The rotary wing likewise produces lift in roughly the upward direction, as does the wing, but spirals through the medium as does the horizontally travelling propeller. Gravitational force is the only other major factor that affects them both in similar and dissimilar ways simultaneously. In the first case, rotary wings and conventional lifting foils generally create lift in 180 degree opposition to gravity, and in the second case, propellers and fans create lift largely in the horizontal plane at approximately a 90 degree opposition to the force of gravity. In essence, a lifting foil is the same device whether it is travelling upwardly, horizontally, or spiraling through the medium it traverses.

Foil-produced lift and foil-produced thrust are in essence the same thing. The principle of operation is the same in spite of differences of terminology we have applied to the phenomenon because of the influence our prevailing cultural orientation has had upon our language. Our language useage influenced by our culture can mislead our perception of technology. When a foil surface is passed through a fluid, pressure differential influences the foil to move toward the direction of the least pressure or foil shape causes pressure differential on opposite sides of the foil. The same principle governing foils interacting with fluids applies whether the result is horizontal movement produced because force moves the foil along a spiral path; it is the same principle governing when horizontal linear force applied to a foil produces lift which is perpendicular to the plane in which the force is applied; it is the same principle governing when vertical movement is produced because force moves the foil along a spiral path. Foil-produced lift and foil-produced thrust are the same phenomenon, the extraction of energy from fluid-dynamic flow, in spite of our language.

Rationally, application of this invention would be to fluid-dynamic foils in general, because they are by means of the pressure differential creating lift or thrust, which in essence is the same thing.

Mobius-like unions or segments of mobius-like structures can be used to join fluid-dynamic foils that are "split" into separated segments and united again in order to increase fluid-dynamic efficiency of the united foil system. These foil segments, though rejoined to the original foil segment, are equivalent to separate foils joined to one another, in that they are separate foil segment which are joined with the initial foil. In appearance they look to be miniature joined wing-like structures on the tips of a conventional wing, and they are in essence the same thing, just terminating differently, because they function according to the same operating principle of this invention—that of redirecting fluid-dynamic pressure flow by maintaining continuity of corresponding surface to corresponding surface when joining pressure-dynamic surface to subsequent pressure-dynamic surface.

It is also possible to utilize this invention to redirect fluid-dynamic pressure through channels or pathways formed by moblus-like unions joined to foils and foil segments. This redirected fluid-dynamic pressure flow can be utilized to cool propulsion systems, engines, and other devices. This redirected pressure flow can also be used to supply and augment pressure used or created by propelling devices and engines. Additionally foil systems utilizing mobius-like structure to unite them can both supply surface burning propulsion devices with pressure-dynamic flow, and in some cases even be the specially prepared surfaces upon which the fuel ignites and burns.

In some cases it is desirable to add "lips," or "cuffs" and extensions to existing mobius-like structure in order to improve fluid-dynamic function and to enhance creation of thrust from redirected fluid-dynamic pressure flow. It is also possible to extend said lips or cuffs into longer, more tubular shapes while still maintaining the principle mode of operation of this invention, namely translation of pressure-dynamic flow from one foil segment to another fluid-dynamic advantage.

Mobius-like structure can be used to join said foil segments or said foils to helical-shaped foil segments which are "wrapped" directionally opposite to the rotational direction normal to that of a shedding vortex. This causes pressure-dynamic flow to be turned inward and opposite the direction normal to rotation of a shed vortex. Greater thrust potential is achieved and vortices are inhibited from forming as they would with use of conventional foil surfaces not having modification. This helical curved foil segment joined to a previous foil segment would also lend itself to surface burn technology. The high pressure from the lower foil surface would supply the burn surface with fluid-dynamic pressure flow, and the surface formed would be designed to function as a burn surface. Thus combustion would occur directly upon specific parts of the configuration formed by said mobius-like structure joining foils and subsequent foil segments, and consequently thrust would be produced. The mobius-like structure joining foils described herein would easily lend itself to adaptation of this kind of technology. Such technology combined with this invention has application to wings, helicopter blades, propellers, and other devices which are likewise foil-based fluid-dynamic systems operating in a fluid medium.

This apparatus has a wide range of potential usage and attachability to an almost unlimited array of structures, particularly those that function in fluid media, and can be joined to various intermediate attachment structures: transportation and vehicular structure in some cases; some automotive systems utilizing foil structure; aircraft structure (which includes ring wings, biplanes, monoplanes, canard aircraft, C wing structure, joined wing, channel wing, boxplane, lifting fuselages and others); various foil structures and attachment methods (joined foils, intermediate foils attached to other surfaces, foil tip and root structure, apparatus tied directly to spar structure, winglets, joined tips, airfoil tip structure, ducted fans, rotary wings, foil structure split into segments, propellers, swept wings, straight wings, delta wings, and cambered surfaces generally including rudders and elevators). Use of these unions results in:

- A. Mobius-like fluid-dynamic structure which will modify the vortex shedding characteristics of foil tips.
- B. Structurally rigid unions of foil segments and complementary fluid-dynamic shapes that modify fluid-dynamic pressure flow.
- C. Mobius-like structure that modifies segmented foil tips so that they become more efficient fluid-dynamic shapes.
- D. Creation of fluid-dynamic unions by uniquely reuniting segments of an individual segmented foil.
- E. Fluid-dynamic structural unions comprising segments of separate foils that are rejoined for fluid-dynamic advantage.
- F. Creation of structure and specific fluid-dynamic shape using mobius-like unions which direct pressure from one foil segment to subsequent foil segment such that favorable fluid-dynamic interaction between these foil segments is made possible for purposes of drag reduction (if adapted and designed correctly this invention has potential to be united with and improve the function of many of these structures: structure intended to extract thrust by means of fluid-dynamic function, structure intended to produce lift, structure intended to affect fluid-dynamic pressure differentials, structure intended to inhibit pressure differential from equalizing, structure intended to impel fluids, structure intended to transition fluid-dynamic flow, structure intended to cause augmentation of fluid-dynamic flow and structure intended to direct fluid-dynamic flow).
- G. Mobius-like joining structure used to develop systems which can utilize combinations of foil segments, unions, complementing panels, and surfaces used for directing fluid-dynamic flow, for reduction of drag, for vortex reduction, for creating surfaces, for special-purpose flow functions, and incorporating drag reducing shapes to augment fluid-dynamic function (these forms of structure can be intended to produce directed thrust, to increase directional thrust, extract thrust by means of fluid-dynamic function, to inhibit pressure differential from equalizing, or to impel fluids. Any foil-related structure having material arrangement, fluid-dynamic element, and designed or proportioned components has potential for combination with this invention including crash protection structure having fluid dynamic characteristics, foils with end plate attachment or structure attached, such as loops, continuous structure, and structure having various aspect ratios).
- H. Incorporation of added moveable control surface elements for directing flow and for modifying fluid-dynamic function used as a means to direct fluid-dynamic flow for lift augmentation, maneuver and flight control (structure for directing fluid-dynamic flow, structure for controlling fluid-dynamic flow, control apparatus structure, structure used for affecting fluid-dynamic flow; structure for affecting directional control, structure for affecting lift augmentation, structure for lift control, structure for affecting conventional maneuver, structure for affecting non-conventional maneuver).
- L. Creation of mobius-like unions which, when combined with fluid-dynamic components, channel fluid-dynamic pressure to specific areas for utilization by fans, blades, engines, or other devices to propel fluids, for cooling, for use as augmenting fluid-dynamic pressure flow for propulsion purposes, or to be used as directed pressure flow to external burn surface propulsion systems (propelling structure, fluid-dynamic lift-producing structure, fluid-dynamic structure involved in thrust production, structure connected to propulsion devices or systems, rotating structure having fluid-dynamic elements, structure which extracts pressure-dynamic energy from fluid-dynamic flow, structure which utilizes foil structure to extract lift from fluid-dynamic flow, structure which translates fluid-dynamic pressure flow to another structure, structure translating fluid-dynamic flow to a subsequent sector of itself, fluid-dynamic structure passively activated by fluid-dynamic flow, foil structure actively modifying or affecting fluid-dynamic flow, helicopter structure, propeller blade structure, structure used for ducting fans, fan blade structure, pump structure, wind-operated foil-bearing fluid-dynamic structure, structure which embodies a plurality of said apparatus).
- J. Using mobius-like structure to join foil segments to subsequent helical or spiral, or otherwise variously shaped foil segments as means of inhibiting vortex production by forcing fluid-dynamic pressure flow to rotate in a direction opposite the direction normal to a shedding vortex and to inhibit vortex shedding (these foil-related structures are intended to produce specific fluid-dynamic functions creating structure intended to modify vortex formation including vortex generator structure, structure intended to modify vortex intensity, structure intended to reduce vortex production resulting from fluid-dynamic function, and structure intended to reduce vortex drag).
- K. Foil segments can be joined by mobius-like structural elements that have "lips" or "cuffs" extended from existing fluid-dynamic elements used as a means to augment efficiency and performance efficiency of foils and foil segments joined by said moblus-like structure or unions.

L. Having mobius-like structural elements join foil segments to subsequent helical (spiral) or variously shaped foil segments forming a fluid-dynamic surface components of a propulsion means used to produce surface burning propulsion (there are many composite systems having function to which variations of this apparatus can be attached for improving their operation: structure for cooling, structure used to augment pressure used by propelling devices and engines, structure of on-surface-bum devices which produce thrust directly on a fluid-dynamic surface, structure using on-surface-burn technology, structure used as a means of containing surface burn combustion).

M. Composite systems comprised of mobius-like structure joining foil segments that direct fluid-dynamic flow for developing thrust, or for use in other purposes that would utilize directed fluid-dynamic pressure from these unions (there are other structures for various fluid-dynamic purposes having diverse characteristics to which this apparatus may be attached for fluid-dynamic function purposes: structure having panel area which operates in a fluid medium, structure having curved shape which operates in a fluid medium, structure having shapes which modify fluid-dynamic pressure flow, the apparatus mounted to structure in tandem, the apparatus mounted to structure in multiples, foil structures that operate in fluid medium, foil-based systems that operate in a fluid medium, scale model structure, marine structure, boat structure, hydrofoil structure, underwater vehicle structure, structure which when combined with said apparatus forms loop or channel shape, foil structure having helical shape, multiple connections in array comprised of foil structure and said apparatus, structure comprised of foil segments and surfaces, structure comprised of foil segments and attached panels, structure comprised of foil segments and unions, structures used to reduce fluid-dynamic drag, structures used for creating new fluid-dynamic surfaces added to existing structure, structures incorporating drag reducing shapes, structure used as projectile or arsenal means, structure temporarily or permanently attached to projectile or arsenal means. There are other categories of foil-based devices having structure, having some fluid-dynamic characteristics, operating in fluid medium, and having the potential for application of this apparatus. These include: foil segment-bearing structure having recreational use; foil segment-bearing structure having commercial use; foil segment-bearing structure having transportation use; foil segment-bearing structure having military use; foil segment-bearing structure having decorative use; foil segment-bearing structure having presentation purposes; kite structure; toy structure; floating cube electric powered kite structure; floating cube aircraft structure; parachute structure; paraglider structure).

N. Fluid-dynamic structural elements which are joined to form surface continuity from a first element surface to surfaces on subsequent elements, creating shape which separates high pressure areas from low pressure areas, thus keeping high pressure flow transitioning across said subsequent surfaces, recirculating it over high pressure areas comprised of said first surface joined to subsequent surfaces which in turn are rejoined to first surface. By keeping high pressure flow on high pressure surfaces longer said fluid-dynamic elements which are joined are used as a means to favor thrust and lift being produced rather than production of shedding vortex. Foil-created high pressure is thereby inhibited from equalizing with low pressure flow and shedding as a vortex, but instead is caused to recirculate with this fluid-dynamic energy being converted to directional thrust and additional lift by the arrangement of said fluid-dynamic elements.

Figure 1B:
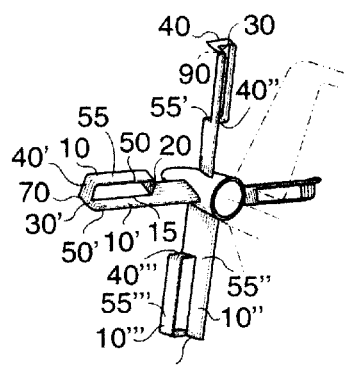
Figure 1C:
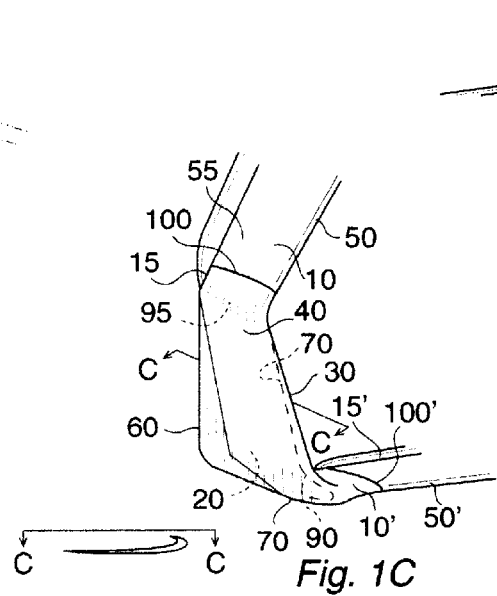
Figure 1D:
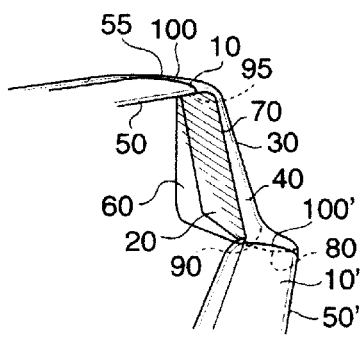
Figure 2:
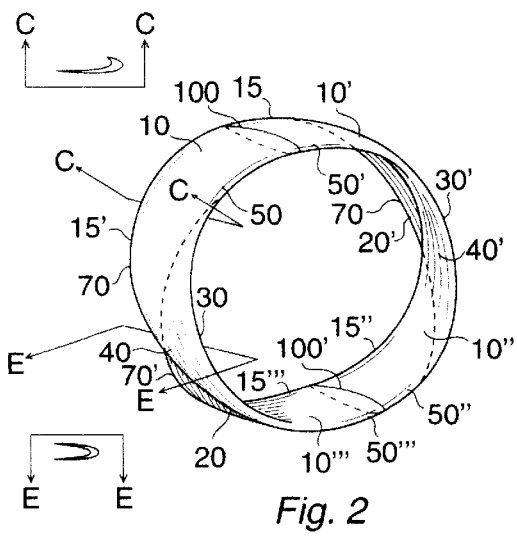
Figure 3:
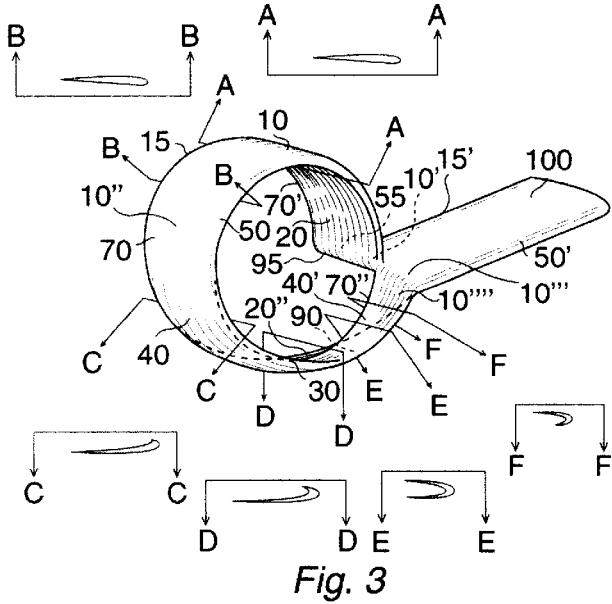
Figure 4:
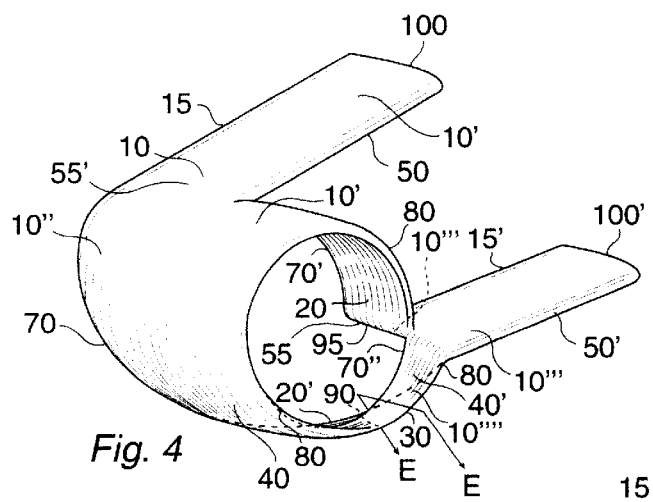
Figure 5:
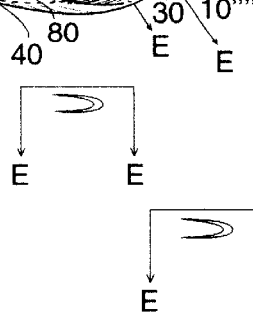
Figure 8:
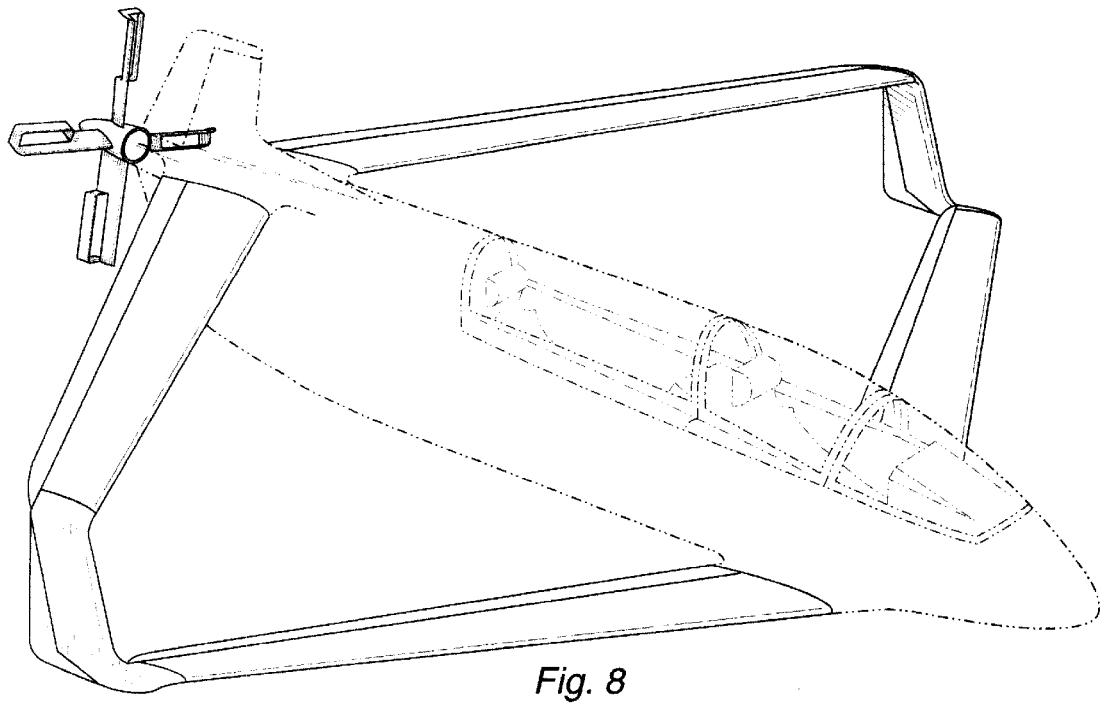
Figure 8B:
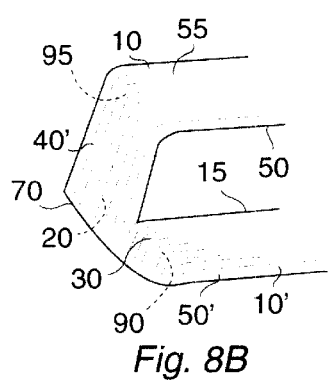
Figure 8C:
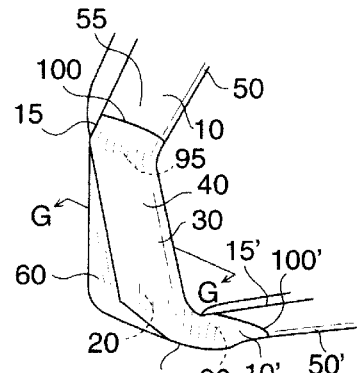
Figure 8D:
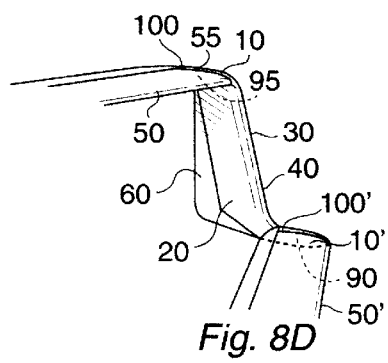
Figure 11:
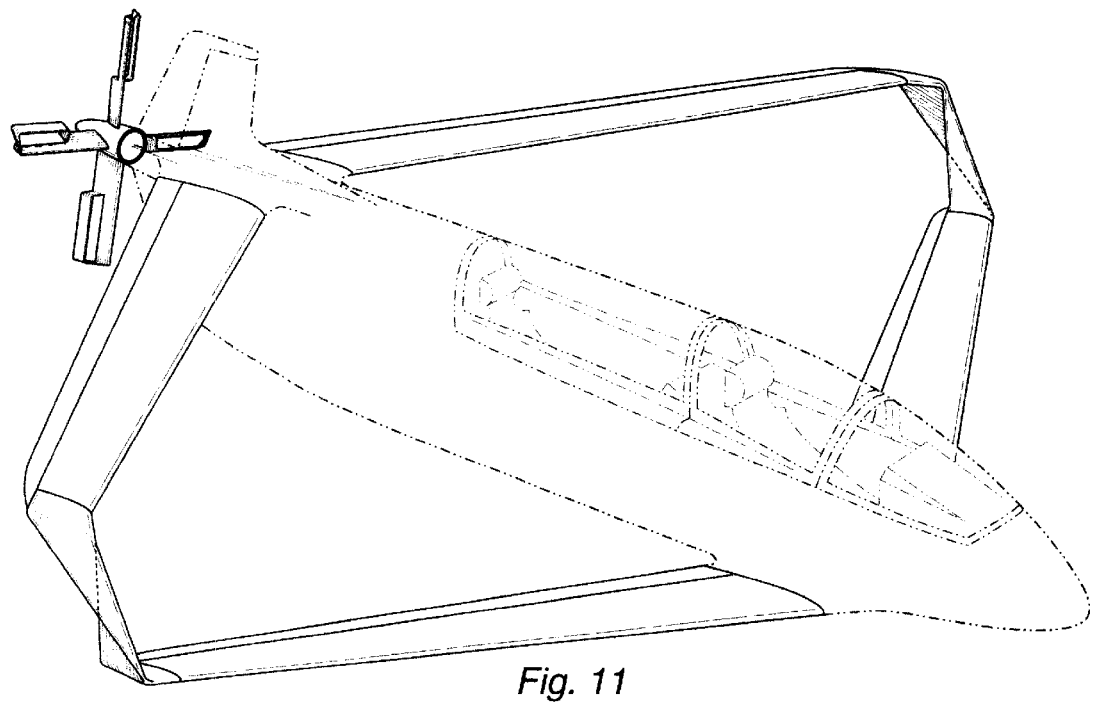
Figure 11B:
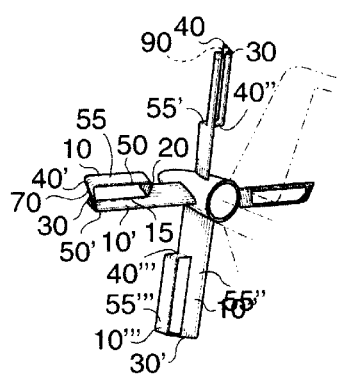
Figure 11C:
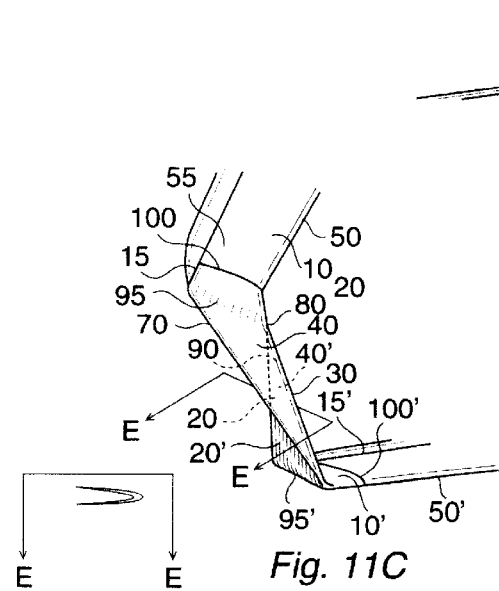
Figure 11D:
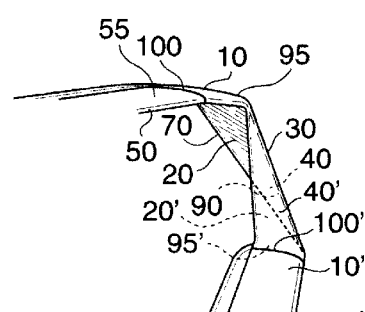
Figure 13:
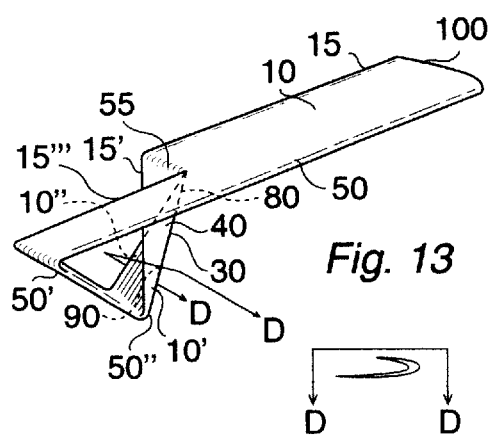
Figure 14:
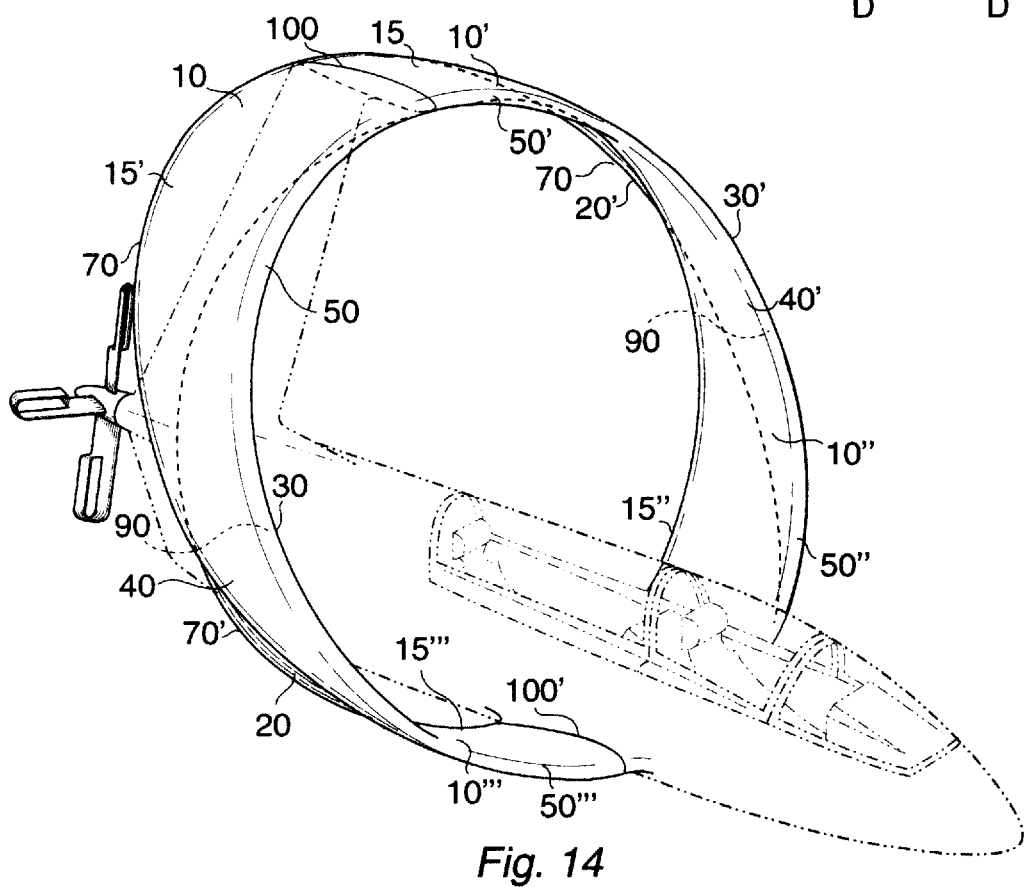
Figure 15:
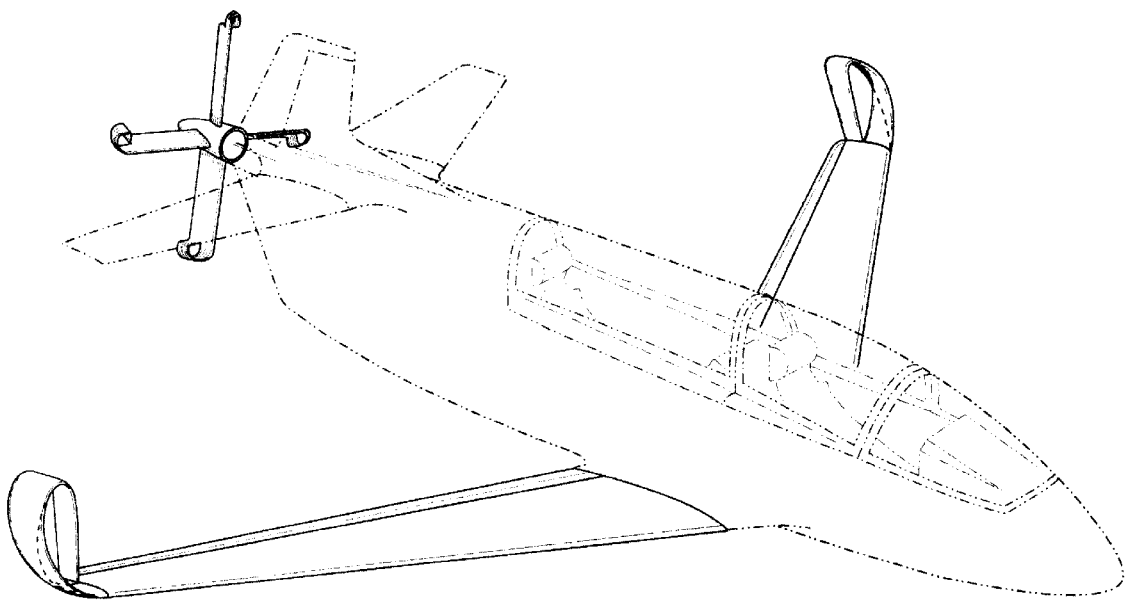
Figure 15B:
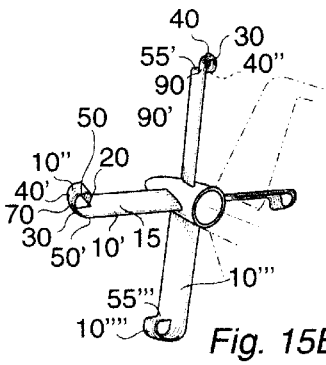
Figure 15C:
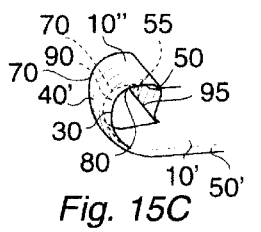
Figure 15D:
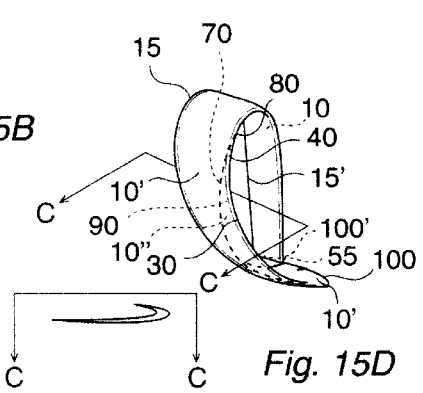
Figure 15E:
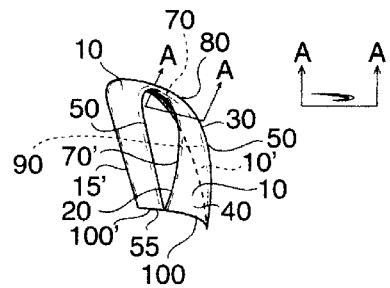
Figure 18:
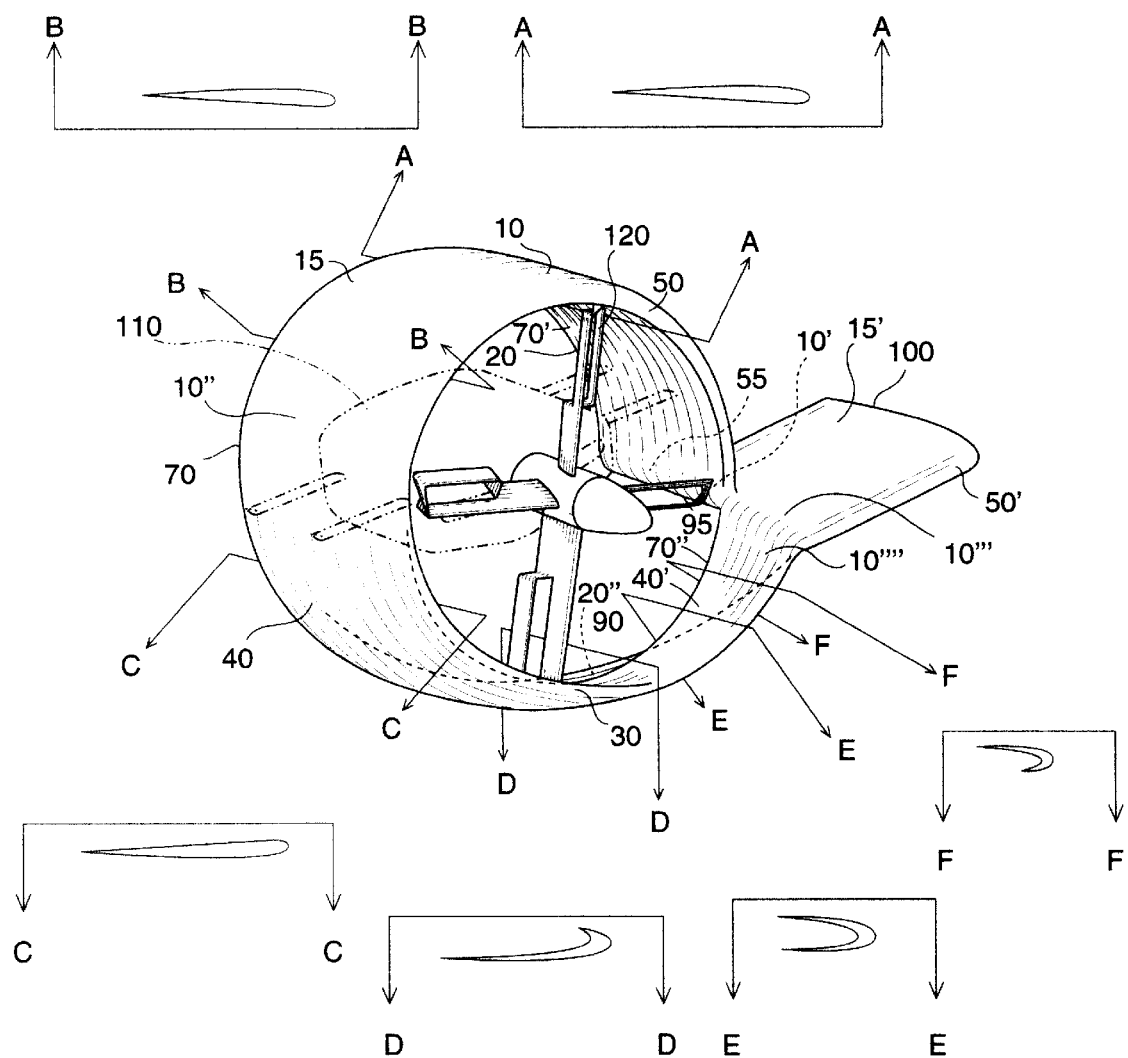
Figure 19:
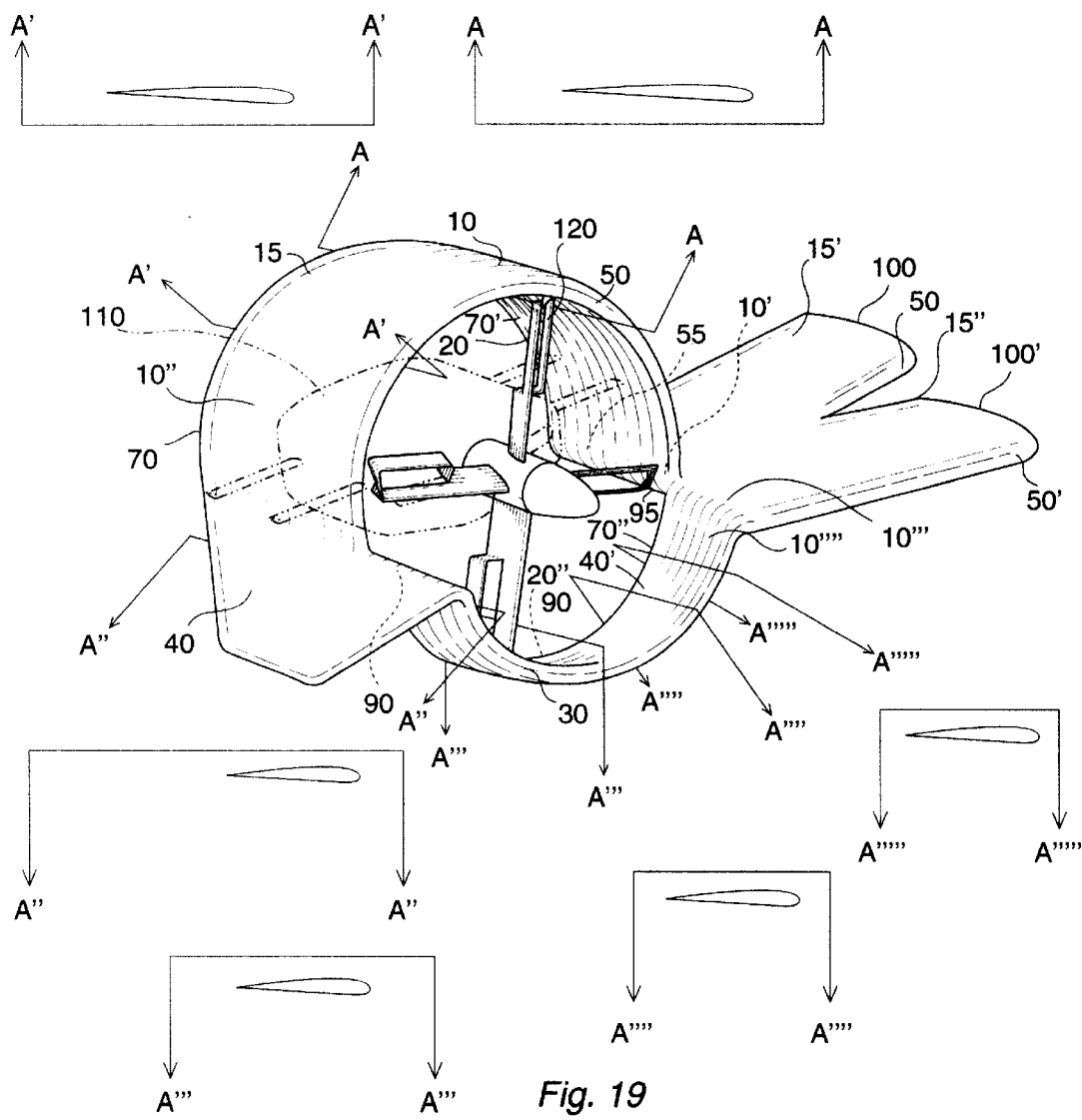
Figure 20:
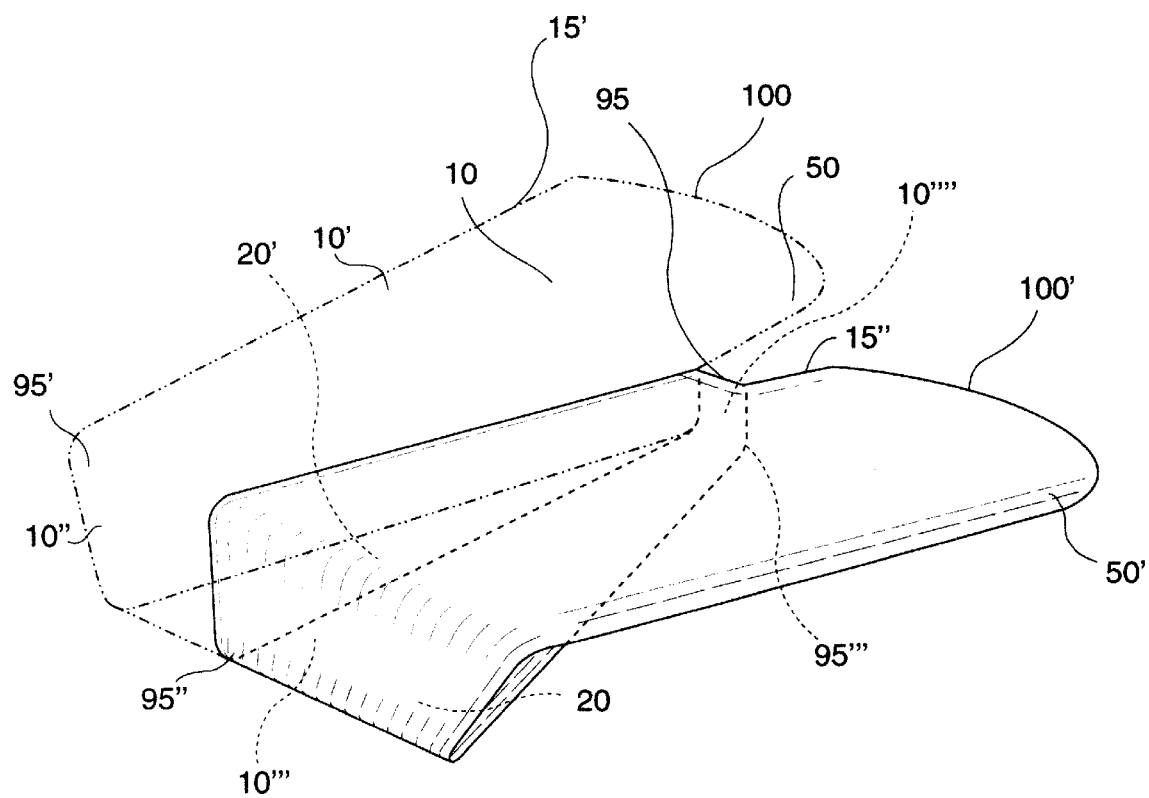
Figure 21:
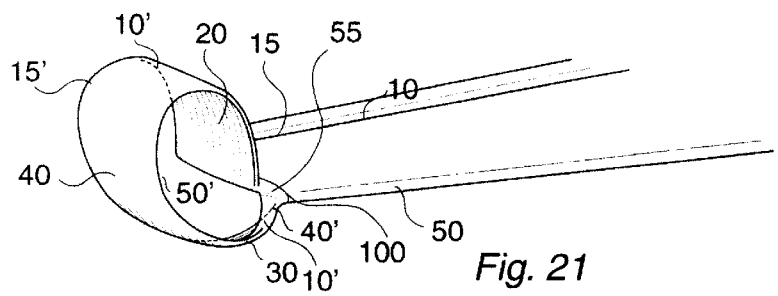
Figure 22:
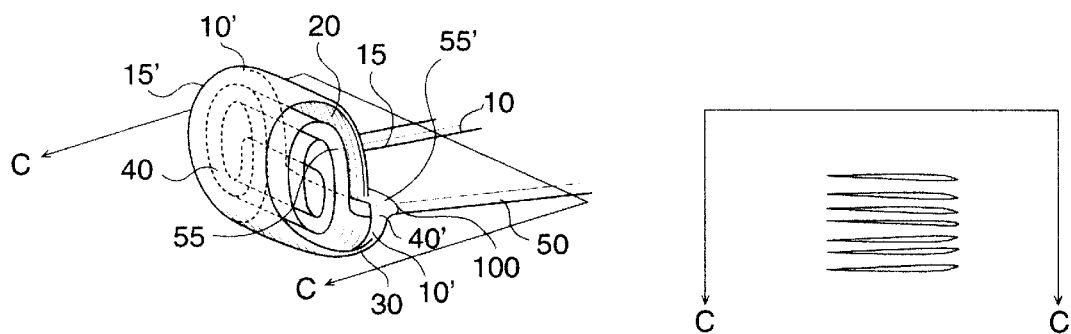
Figure 23:
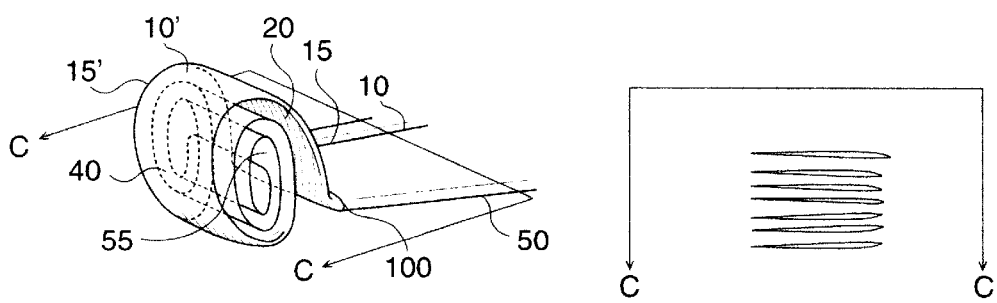
Figure 24:
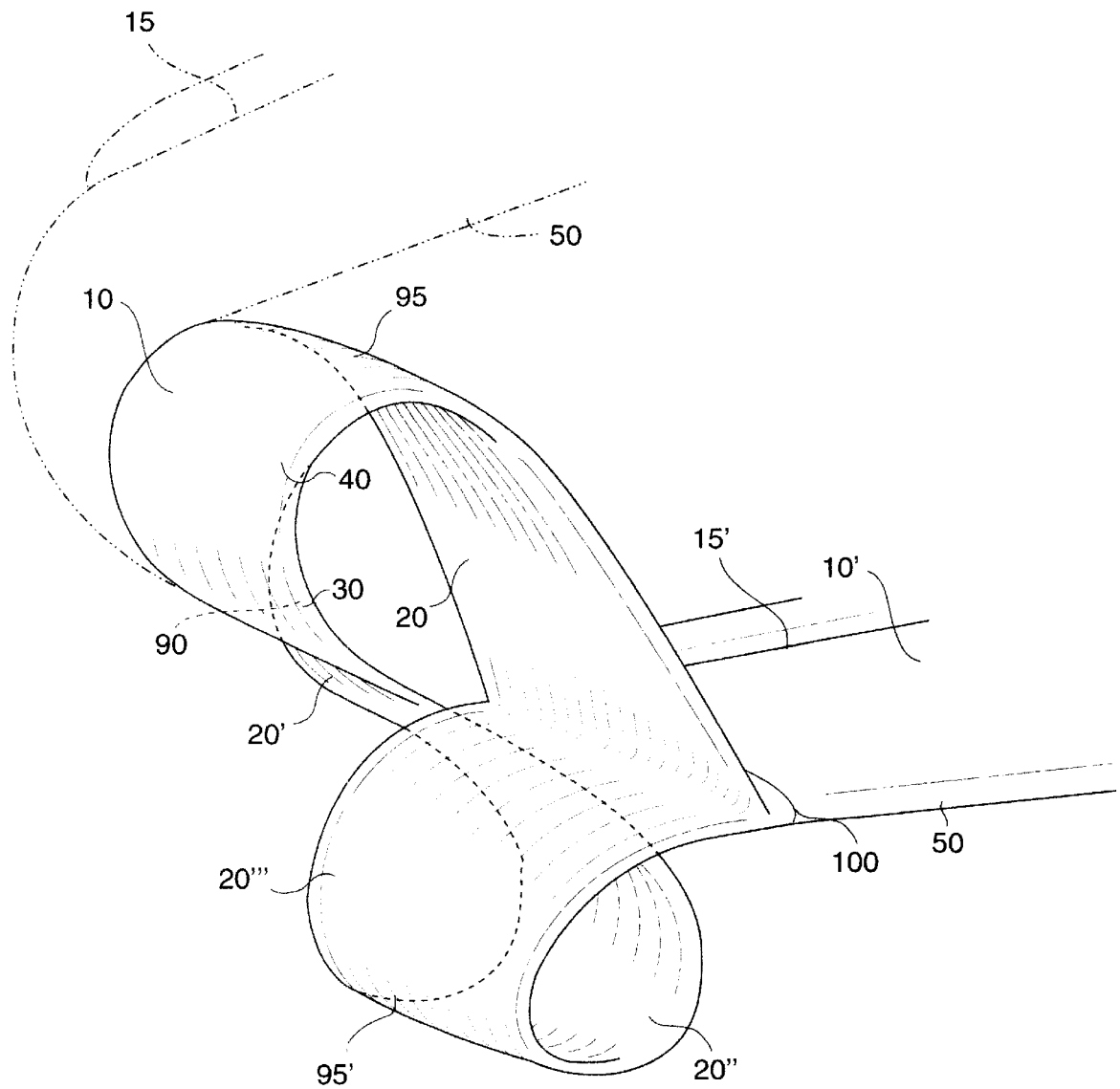
Figure 25:
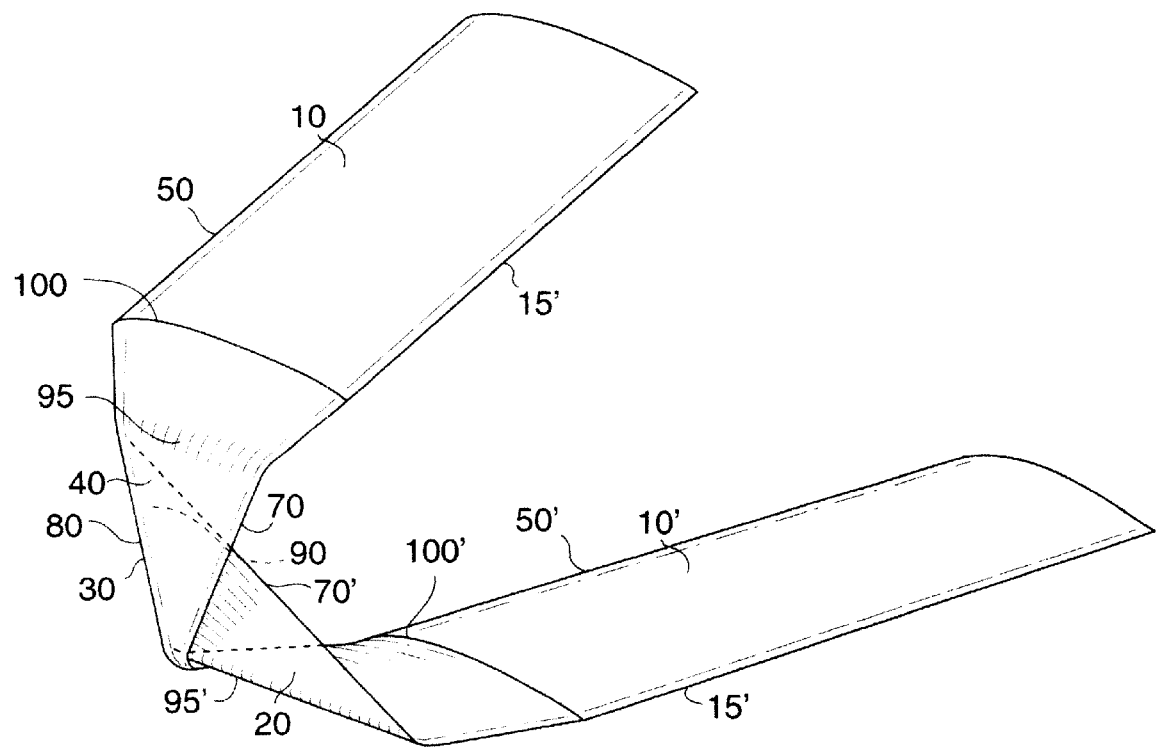
Figure 26:
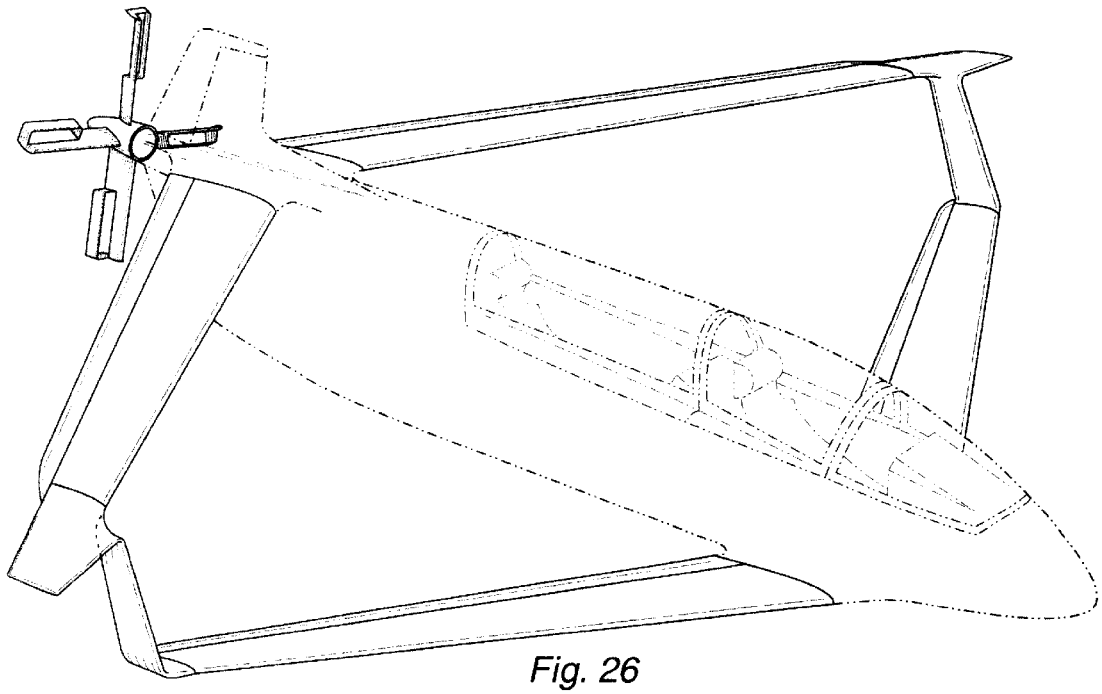
Figure 26B:
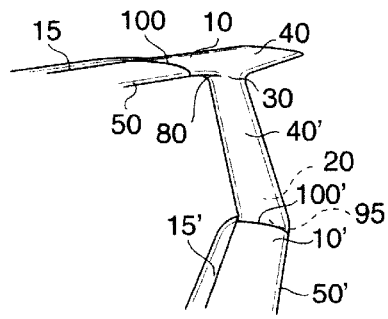
Figure 26A:
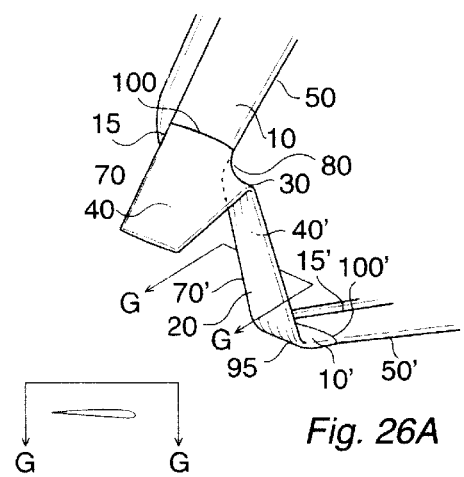

FIG. 1 Joined wing union having cuffs on aircraft with joined split blade propeller having no lip or cuff-like shape FIG. 1B Detail of split blade tip FIG. 1C Detail of right wingtip union with cros-section FIG. 1D Detail of left wingtip union FIG. 2 Two adjacent curved foil tip unions—equivalent of a modified ring wing FIG. 3 Ring tipped blade or foil with sectional views FIG. 4 Ring tipped joined union of blades or foils FIG. 5 Semi-ring tipped blade or foil FIG. 6 Multiplied split blade or foil FIG. 7 Double foil or biplane configuration with tip unions FIG. 8 Joined wing union having no lip or cuff-like shape on aircraft and joined split blade propeller having no lip or cuff-like shape FIG. 8B Detail of split blade Up FIG. 8C Detail of right wingtip union with sectional views FIG. 8D Detail of left wingtip union FIG. 9 Joined wing union on aircraft having high mobius-like channels and joined split blade propeller having lip or cuff-like shape FIG. 9A Detail of right wingtip union with sectional views FIG. 9B Detail of left wingtip union FIG. 10 Moblus-like dual foil union having channel blended into control surface FIG. 11 Joined wing union having straight sided mobius-like channels on aircraft and joined split blade propeller having straight sided mobius-like channel FIG. 11B Detail of split blade propeller FIG. 11C Detail of right wingtip union with sectional views FIG. 11D Detail of left wingtip union FIG. 12 Joined wing union having semi-circular mobius-like channels on aircraft and joined split blade propeller FIG. 12B Detail of split blade tip with sectional views FIG. 12C Detail of right wingtip union with sectional views FIG. 12D Detail of left wingtip union FIG. 13 Triangular tipped blade or foil FIG. 14 Ring wing having semi-circular moblus-like channels on aircraft and joined split blade propeller having semi-circular mobius-like channels FIG. 15 Monoplane with joined split foil having mobius-like channels and joined split blade propeller having moblus-like channels FIG. 15B Detail of split blade FIG. 15C Detail of split blade tip FIG. 15D Detail of right wingtip union with sectional views FIG. 15E Detail of left wingtip union FIG. 16 Joined wing union with split foil having foil segments attached to wingtips on aircraft and joined split blade propeller FIG. 16A Detail of right wingtip union with sectional views FIG. 16B Detail of left wingtip union with sectional views FIG. 17 Aircraft with mobius-like vortex-modifying tips FIG. 17A Detail of right wingtip union with mobius-like tip FIG. 17B Detail of left wingtip union with mobius-like tip FIG. 18 Ring tip foil having moblus-like channels for flow direction with propulsion means attached with sectional views FIG. 19 Mobius-like union modifying channel wing style joined foil union with propulsion means attached with sectional views FIG. 20 Joined tip with channel formed by double joining of foil segments also applicable to joined wing when modified as shown by phantom lines FIG. 21 Mobius-like split foil wing tip loop FIG. 22 Mobius-like split foil with loop transitioning into helix shaped foil FIG. 23 Mobius-like wing tip transitioning into helix shaped foil FIG. 24 Mobius-like wing tip having FIG. 8 loop and mobius-like channel also applicable to joined wing when modified as shown by phantom lines FIG. 25 Mobius-like channel type union for wings having leading pairs higher than rear wing pairs FIG. 26 Mobius-like joined wing union on aircraft having open extended or extruded tip FIG. 26A Detail of right wingtip union with sectional views FIG. 26B Detail of left wingtip union

REFERENCE NUMERALS IN DRAWINGS

10 Surface corresponding to upper foil segment surfaces
15 Trailing edge of upper corresponding surface
20 Mobius-like transitional surface corresponding to lower foil surfaces
30 Outer surface of most acute mobius-like transitional curve
40 Mobius-like transitional surface corresponding to upper foil segment surfaces
50 Leading edge of upper corresponding surface
55 Foil segment subsequent to a previous one
60 Control surface integrated into mobius-like transitional panel
70 Trailing edge of transitional panel which joins the trailing edge of foil segment to the leading edge of the next subsequent foil segment
80 Leading edge of transitional panel which joins the leading edge of foil segment to the trailing edge of the next subsequent foil segment
90 Inner surface of most acute moblus-like transitional curve
95 Mobius-like transitional curve
100 Inner root of tip union joined to outer tip of foil segment
110 Engine or propulsion means
120 Propeller or propulsion device

BACKGROUND OF THE INVENTION

This invention relates primarily to improvement in methods of uniting wingtips and aircraft airfoil components for rigidity with the additional effect of producing greater aerodynamic efficiency. This invention is applicable to strengthening outer tip fluid foil unions with improved fluid-dynamic efficiency and minimization of induced drag. The invention has application to structural and aerodynamic improvement of joined wings, biplane wings, elevator-to-wingtip, canard-to-wingtip unions, foils that split and are rejoined, and unions at the tips of any adjacent fluid dynamic foils whose structure is similar to a joined wing. The curvatures inherent in this invention maintain stiffness at joined outer wingtip and fluid foil intersections without creating additional fluid dynamic drag.

This method of tip union, rather than creating additional induced drag, transitions lift-induced fluid-dynamic pressure flow (a high pressure flow which normally rotates around a foil, shedding into a vortex at a tip) from a primary fluid-dynamic foil surface to intercept the lift-induced fluid-dynamic pressure flow of a subsequent foil such that this translated pressure flow does not meet the fluid-dynamic pressure flow of said subsequent foil with interference, but flows in so as to complement and augment the lift-induced fluid-dynamic pressure flow, amplifying rather than disrupting the vortical rotational pattern normally characteristic of said subsequent foil surface. This arrangement of elements inhibits free tip vortices from developing and shedding and as well creates additional structural stiffness when utilized to join foils. Some of this foil-induced differential pressure transitioned is utilized to produce forward thrust. This invention is characterized by having greater strength and stiffness, increased fluid dynamic efficiency, and less lift-induced vortex drag than does convention wing and foil structure.

Descriptions of structure and examples of function:

1. A union is created when a fluid-dynamic foil is joined to another by means of a mobius-like union or segment of a mobius-like structure, the resulting structure (all figs shown) will modify normally occurring fluid-dynamic flow such that fluid-dynamic drag is reduced.

2. A union (all figs. shown) created when a fluid-dynamic foil is joined to another by means of a mobius-like union or segment of a moblus-like element such that one fluid-dynamic foil surface is joined continuously to a corresponding fluid-dynamic foil surface by a moblus-like union or segment of moblus-like structure causing fluid-dynamic flow from a first foil to transition to a subsequent foil by means of this union with minimum fluid-dynamic interferences.

3. A mobius-like union (all figs. shown) of one fluid dynamic foil to another or a union of said foils created by using either a segment or multiple segments of mobius-like structure to join said foils such that fluid-dynamic tip vortices are thereby reduced or not allowed to form because of said union.

4. Creation of a mobius-like union of one fluid-dynamic foil to one another having appearance as if a single long fluid-dynamic foil is bent, wrapped or formed (FIG. 7) to create one or more mobius-like shapes or the equivalent of one or more segments of said mobius-like shapes such that corresponding primary fluid-dynamic surfaces are oriented in the same corresponding directions. The result is structure which cause fluid-dynamic vortices to be reduced or not be allowed to form, fluid flow interference being minimized, and fluid-dynamic drag thereby being reduced.

5. Said mobius-like unions or bends formed into fluid-dynamic foil systems (all figs. shown) cause foil-induced fluid-dynamic pressure to be channeled such that differential in fluid-dynamic pressures can be used to produce forward thrust.

6. Such mobius-like unions or segments of moblus-like structures can be used to join fluid-dynamic foils that are "split" into separated segments and united again (FIGS. 3, 5, & 6), in order to increase fluid-dynamic efficiency of the united foil system. These foil segments, though rejoined to the original foil segment, are equivalent to separate foils joined to one another. In essence they look to be miniature joined wing-like structures on the tips of a conventional wing, and they maintaining continuity of surface to corresponding surface.

7. This type of mobius-like structure (FIGS. 3, 5, & 6) is created when a fluid-dynamic foil is joined to itself by means of one or more mobius-like unions or segment of mobius-like elements (ref. nos. 30 & 40). The segments of said fluid-dynamic foil are united by use of transitional elements, said unions creating mobius-like structures which are the means of joining upper low pressure surface of a first foil segment (typical ref. no. 10) to upper low pressure surface of a subsequent foil segment (typical ref. no. 10'), and lower high pressure surface of said first foil segment to lower high pressure surface of said subsequent foil surface.

8. A fluid-dynamic foil (FIGS. 1B, 3, 5, & 6) being split into two or more segments can be reunited by joining said segments by means of utilizing mobius-like unions or segments of moblus-like structures to join them.

9. Mobius-like unions, bends or folds or segments of mobius-like structures can be used to join single or compound structures (FIGS. 1–8) of fluid-dynamic foils, joined wings, annular or ring wings, split foils, winglets, other tip-mounted performance-improving devices, blades, fans or hydrofoils to make them more rigid as well as more fluid-dynamically efficient.

10. Improvement in the prior art is possible by using mobius-like unions, bends, folds or segments of mobius-like structures to join single or compound structures (FIGS. 1–8) of fluid foils, joined wings, annular or ring wings, split foils, winglets, other tip mounted performance-improving devices, blades, fans or hydrofoils to reduce or eliminate vortex formation.

11. Improvement in the prior art is possible by using mobius-like unions, bends, folds or segments of mobius-like structures to join single or compound structures (FIGS. 1–8) of fluid foils, joined wings, annular or ring wings, split foils, winglets, other tip mounted performance-improving devices, blades, fans or hydrofoils such that fluid dynamic pressures creating lift also produce forward thrust while lessen vortex-created drag.

12. Mobius-like unions or segments of mobius-like structures (FIGS. 1–8) can be used between foils or segments of foils to join them such that vortices which are normally formed by foils traversing a fluid are reduced or eliminated.

13. Mobius-like unions or segments of mobius-like structures can be used to join fluid-dynamic foils or segments of said foils (FIGS. 1–8) such that fluid-dynamic pressures are channeled, "translated", or caused to transition in such a way as to produce thrust, or reduce fluid-dynamic drag.

14. Said mobius-like fluid foil segments or mobius-structures having or functioning as moveable control surfaces (FIGS. 1, 1C, 1D, 8, 8C, & 8D) can be incorporated as elements which change in pitch and angle while operating various attitudes resulting in dynamic trim and controls, said foils being hinged, warped, bent, or shaped at various angles, or designed to various, yet to be specified proportions.

15. A mobius-like tip union or segment of mobius-like element can be structured as a union to join fluid-dynamic foils such that fluid-dynamic pressure flow translates from a first fluid-dynamic foil having top and bottom surfaces to a subsequent fluid-dynamic foil having corresponding top and bottom surfaces joined (FIGS. 1, 2, 4, 7 & 8) in such a way that interference to rotating vortical circulation normally occurring around said subsequent fluid-dynamic foil is minimized and the pressure flow transitioning augments, rather than opposes, the vortical circulation of said subsequent foil. Said pressure flow transitioning favors the rotation direction of said vortical circulation of said subsequent foil.

16. Stiffer mobius-like structures or segment of mobius-like structures of curved or straight panels functioning as uniting elements can join first fluid-dynamic surfaces to adjacent subsequent fluid-dynamic surfaces (FIGS. 1–8). Fluid-dynamic pressure flow from each first fluid-dynamic foil continues across said uniting element to intercept each subsequent fluid-dynamic surface, producing minimum change in the rotational direction of the vortical rotating circulation flow normal to said adjacent subsequent fluid-dynamic foil and creating minimal interference while augmenting rather than interfering with said pressure-dynamic flow from said first fluid-dynamic foil to said subsequent fluid-dynamic foil.

17. By using one or more mobius-like unions or mobius-like elements to join the surfaces of a first foil to corresponding surfaces of a subsequent foil surface (FIGS. 1, 2, 4, 7 & 8) higher fluid-dynamic pressure from the lower surface of said first foil is redirected to the corresponding lower surface of said subsequent foil, said moblus-like unions or segments of mobius-like elements being the means of fluid redirection.

18. Joining moblus-like unions or segments of mobius-like structures (FIGS. 1–8) enables channelling of fluid-dynamic flow from one foil segment to another.

19. The structure (FIGS. 1–8) that results when a fluid-dynamic foil is shaped by use of moblus-like intersections or segments of mobius-like unions exhibits the appearance of having been folded, wrapped, or doubled over and has the unique characteristic of forming continuously joined upper low pressure surfaces with obviously differentiated lower high pressure surfaces which together produce the lift/thrust phenomenon.

20. When channels are formed on some segments using mobius-like unions or segments of mobius-like structures to unite foil segments of split or multiply-split foils (FIGS. 1B, 3, 5, & 6) such structure can be tuned or adjusted such that fluid-dynamic drag is reduced substantially more than with structures of the prior art.

21. Joining fluid-dynamic foils with mobius-like unions or unions consisting of segments of a moblus-like structures allows creation of channels wherein fluid-dynamic pressure flows from one foil surface are transitioned to the corresponding surface of an adjacent foil (FIGS. 1, 1C, 1D, 2, 4, & 7, ref. no. 30).

22. A mobius-like fold, bend, wrap, or segment of mobius-like element becomes the structural transitional element used to form what can be described by terms such as a groove, a pocket, or a channel between one area of a foil transitions to a corresponding subsequent area of the foil (FIGS. 3 & 5, ref. nos. 30 & 40) These panels of structural element are the means by which the fluid-dynamic pressure flow transitions from said first one area of a foil to said subsequent area of the foil.

23. Mobius-like structural transitional element or segment of mobius-like structure can be used to create a union having no pocket, channel or groove formed between foils (FIG. 1B, 8, 8B, 8C, & 8D ref. no. 40) and the resulting mobius-like structure will operate in a more direct manner whereby fluid-dynamic pressure flows from one fluid-dynamic foil surface are transitioned to a corresponding subsequent fluid-dynamic foil surface. Foil-shaped sections of the mobius-like structure create pressure transition and some forward thrust without channels or surfaces used as the means to produce forward thrust.

24. Mobius-like structural elements (ref. nos. 30 & 40) or segments of mobius-like structures can be used to unite a first curved, semi-circular, or straight foil segment to subsequent curved, semi-circular, or straight foil or foil segments such that upper surface of a first foil or foil segment is attached to upper surface of a subsequent foil or foil segment, and lower surface of said first foil or foil segment is attached to lower surface of said subsequent foil or foil segment (FIGS. 1, 2, 4, 6, 7 & 8).

25. Mobius-like structural elements (ref. nos. 30 & 40) or segments of mobius-like structures can be used to unite a first curved or semi-circular foil or foil segment to a subsequent curved or semi-circular foil or foil segment such that upper surface (ref. nos. 10 or 10') of a first foil or foil segment is attached to upper surface of a subsequent foil or foil segment (ref. nos. 10" or 10'''), and lower surface of said first foil or foil segment is attached to lower surface of said subsequent foil or foil segment forming a ring-shaped fluid-dynamic joined foil system which can be characterized as having the appearance of an annular or modified ring wing (FIG. 2).

26. Mobius-like structural elements (ref. nos. 30 & 40) or segments of mobius-like structures can be used to unite a first conventionally shaped foil or foil segment to a subsequent and said subsequent to next subsequent conventionally shaped foils or foil segments such that upper surface (ref. nos. 10 or 10') of a first foil or foil segment is attached to upper surface of a subsequent foil or foil segment (ref. nos. 10' or 10''') and subsequent to next subsequent etc., and lower surface of said first foil or foil segment is attached to lower surface of said subsequent and to next subsequent foil or foil segment forming a fluid-dynamic joined foil system which can be characterized as having the appearance of conventional multi-wing systems such as a biplane or triplane arrangements with mobius-like tip unions (FIG. 2).

27. Fluid-dynamic structural elements can be used as components for systems which use surface burn technology for propulsion. Whenever pockets are formed, or "grooves," there is the potential of incorporating these surfaces as areas of attachment or as specially prepared surface for a surface burning propulsion system. Structures that have surface continuity which keeps high pressure flow transitioning across high pressure surfaces longer and inhibit equalization of high and low pressure flows lend themselves favorably as components of said systems which use surface burn technology for propulsion (FIGS. 17, 22, 23, & 24 especially).

28. Fluid-dynamic structural elements which are joined to form surface continuity from a first element surface to surfaces on subsequent elements, creating shape which separates high pressure areas from low pressure areas, thus keeping high pressure flow transitioning across said subsequent surfaces, recirculating it over high pressure areas comprised of said first surface joined to subsequent surfaces which in turn are rejoined to first surface. By keeping high pressure flow on high pressure surfaces longer said fluid-dynamic elements which are joined are used as a means to favor thrust and lift being produced rather than production of shedding vortex. Foil-created high pressure is thereby inhibited from equalizing with low pressure flow and shedding as a vortex, but instead is caused to recirculate with this fluid-dynamic energy being converted to additional lift and directional thrust by the arrangement of said fluid-dynamic elements.

29. This apparatus has a wide range of potential usage and attachability to an almost unlimited array of structures, particularly those that function in fluid media, and can be joined to various intermediate attachment structures: transportation and vehicular structure in some cases, some automotive systems utilizing foil structure, aircraft structure (which includes ring wings, biplanes, monoplanes, canard aircraft, C wing structure, joined wing, channel wing, boxplane, lifting fuselages and others), various foil structures and attachment methods (joined foils, intermediate foils attached to other surfaces, foil tip and root structure, apparatus tied directly to spar structure, winglets, joined tips, airfoil tip structure, ducted fans, rotary wings, foil structure split into segments, propellers, swept wings, straight wings, delta wings, and cambered surfaces generally including rudders and elevators).

I claim:

1. A joining structure for at least one fluid dynamic structure, said fluid dynamic structure comprising a leading and a trailing edge with a pressure surface and a suction surface between said leading and trailing edges and an end, said joining structure having a first surface and a second surface and at least two ends, one end of said joining structure is connected to said end of said fluid dynamic structure such that said first surface of said joining structure is continuous with the suction surface of said fluid dynamic structure and the second surface of said fluid dynamic structure is continuous with the pressure surface of said fluid dynamic structure, and said joining structure curves and twists such that the second end thereof is also connected to an end of at least one subsequently joined fluid dynamic structure with said first surface of said joining structure now continuous with the subsequent suction surface of said joined fluid dynamic structure, and said second surface of said joining structure now continuous with the subsequent pressure surface of said joined fluid dynamic structure.

2. The apparatus of claim 1 wherein said subsequently joined structure is at least one fluid dynamic structure.

3. The apparatus of claim 2 wherein said subsequently joined structure is the joining structure.

4. The apparatus of claim 2 wherein said subsequently joined structure is at least one other joining structure.

5. The apparatus of claim 1 wherein at least one structural element of said apparatus is connected to at least one structure operating in at least one fluid medium.

6. The apparatus of claim 1 wherein at least one structural element of said apparatus is connected to foil-related structure selected from the group consisting of structures which operate in fluid medium, structure used as attachment means, transportation structure, vehicular structure, automotive systems utilizing foil structure, aircraft structure, ring wing structure, biplane structure, canard structure, boxplane structure, C wing structure, joined wing structure, channel wing structure, joined foil structure, intermediate foil structure, foil root structure, foil tip structure, spar structure, winglet structure, joined tip structure, airfoil tip structure, ducted fan structure, rotary wing structure, foil structure split into segments, i.e. segmented foil structure, propeller structure, swept foil structure, straight foil structure, delta foil structure, lifting fuselage structure, cambered surface structure, rudder structure, elevator structure, crash protection structure, structure having material arrangements, fluid-dynamic elements, and proportioned components, foil structure having end plate attachments, foil structure having attached loops or continuity of structure, foil structure of various aspect ratio, structure intended to extract thrust by means of fluid-dynamic function, structure intended to produce lift, structure intended to affect fluid-dynamic pressure differentials, structure intended to inhibit pressure differential from equalizing, structure intended to impel fluids, structure intended to transition fluid-dynamic flow, structure intended to cause augmentation of fluid-dynamic flow, structure intended to direct fluid-dynamic flow, structure intended to modify vortex formation, vortex generator structure, structure intended to modify vortex intensity, structure intended to reduce vortex production resulting from fluid-dynamic function, structure intended to reduce vortex drag, structure intended to produce directed thrust, structure intended to increase directional thrust, structure intended to extract thrust by means of fluid-dynamic function, structure intended to inhibit pressure differential from equalizing, structure intended to impel fluids, structure for cooling, structure used to augment pressure used by propelling devices and engines, structure of on-surface-burn devices which produce thrust directly on a fluid-dynamic surface, structure using on-surface-burn technology, structure used as a means of containing surface burn combustion, structure having panel area which operates in a fluid medium, structure having curved shape which operates in a fluid medium, structure having shapes which modify fluid-dynamic pressure flow, said apparatus mounted to structure in tandem, said apparatus mounted to structure in multiples, foil structures that operate in fluid medium, foil-based systems that operate in a fluid medium, scale model structure, marine structure, boat structure, hydrofoil structure, underwater vehicle structure, propelling structure, fluid-dynamic lift-producing structure, fluid-dynamic structure involved in thrust-production, structure connected to propulsion devices or systems, rotating structure having fluid-dynamic elements, structure which extracts pressure-dynamic energy from fluid-dynamic flow, structure which utilizes foil structure to extract lift from fluid-dynamic flow, structure which translates fluid-dynamic pressure flow to another structure, structure translating fluid-dynamic flow to a subsequent sector of itself, fluid-dynamic structure passively activated by fluid-dynamic flow, foil structure actively modifying or affecting fluid-dynamic flow, helicopter structure, propeller blade structure, structure used for ducting fans, fan blade structure, pump structure, wind-operated foil-bearing fluid-dynamic structure, structure which embodies a plurality of said apparatus, structure which when combined with said apparatus forms loop or channel shape, foil structure having helical shape, multiple connections in array comprised of foil structure and said apparatus, structure comprised of foil segments and surfaces, structure comprised of foil segments and attached panels, structure comprised of foil segments and unions, structures used to reduce fluid-dynamic drag, structures used for creating new fluid-dynamic surfaces added to existing structure, structures incorporating drag reducing shapes, structure for directing fluid-dynamic flow, structure for controlling fluid-dynamic flow, control apparatus structure, structure used for affecting fluid-dynamic flow, structure for affecting directional control, structure for affecting lift augmentation, structure for lift control, structure for affecting conventional maneuver, structure for affecting non-conventional maneuver, structure used as projectile or arsenal means, structure temporarily attached to projectile or arsenal means, structure permanently attached to projectile or arsenal means, structure of foil-based devices, structure of fluid-dynamic systems operating in fluid medium, foil segment-bearing structure having recreational use, foil segment-bearing structure having commercial use, foil segment-bearing structure having transportation use, foil segment-bearing structure having military use, foil segment-bearing structure having decorative use, foil segment-bearing structure having presentation purposes, kite structure, toy structure, floating cube electric powered kite structure, floating cube aircraft structure, parachute structure, and paraglider structure.

7. The apparatus of claim 1 wherein at least one structural element of the apparatus is used as means to modify or redirect fluid-dynamic flow.

8. The apparatus of claim 1 wherein deformable, articulating, or moveable auxiliary surface is connected to said apparatus.

9. The apparatus of claim 1 wherein at least one structural element comprises deformable, articulating, or moveable structure.

10. The apparatus of claim 1 wherein at least one structural element of said apparatus is connected to propulsion means.

11. The joining structure of claim 1 wherein a said joining structure has a plurality of ends joined to at least one other joining structure.

12. The apparatus of claim 1 wherein at least two joining structures are united thereby forming continuous or ring-shaped structure.

13. The apparatus of claim 1 wherein a plurality of said apparatus are structurally united.

14. The joining structure of claim 1 wherein there is a plurality of connections between at least one joining structure and at least one fluid dynamic foil.

15. The apparatus of claim 1 wherein at least one structural element of said apparatus is modified so as to comprise at least one lip or cuff-like shape extended or extruded from said element of said apparatus.

16. The apparatus of claims 15 wherein at least one structural element of said apparatus having at least one lip or cuff-like shape is further shaped or extruded into tubular or hollow form.

17. The apparatus of claim 1 wherein at least one structural element of said apparatus is used in a surface burn propulsion system.

18. The apparatus of claim 1 comprising at least one joining structure united to at least one foil, and said joining structure curves and twists such that said apparatus thereby has helical shape or spiral curve.

19. A joining structure for at least one fluid dynamic structure, said fluid dynamic structure comprising a leading and a trailing edge with a pressure surface and a suction surface between said leading and trailing edges and an end, said joining structure having a first surface and a second surface and at least two ends, one end of said joining structure is connected to said end of said fluid dynamic structure such that said first surface of said joining structure is continuous with said suction surface of said fluid dynamic structure and the second surface of said fluid dynamic structure is continuous with said pressure surface of said fluid dynamic structure, and wherein at least one edge is formed on said joining structure by the adjacency of the suction surface to the pressure surface, and wherein said one edge is continuous on said joining structure from the proximity of said trailing edge of said fluid dynamic structure to said leading edge of said joining structure, and wherein there is a next subsequent attachment of fluid dynamic structure to said joining structure with the suction surface of the next subsequently attached fluid dynamic structure now continuous with said first surface of said joining structure, and with said pressure surface of said next subsequently attached fluid dynamic structure now continuous with said second surface of said joining structure.

20. A joining structure for at least one fluid dynamic structure, said fluid dynamic structure comprising a leading and a trailing edge with a pressure surface and a suction surface between said leading and trailing edges and an end, said joining structure having a first surface and a second surface and at least two ends, one end of said joining structure is connected to said end of said fluid dynamic structure such that said first surface of said joining structure is continuous with said suction surface of said fluid dynamic structure and said second surface of said fluid dynamic structure is continuous with said pressure surface of said fluid dynamic structure, and wherein at least one extrusion is extended from said joining structure, and wherein said extrusion subsequently rejoins said joining structure and wherein said extrusion is thereby evolved into at least one loop or channel structure, and wherein the subsequent end of said extrusion rejoins said joining structure with the first side of said extrusion now continuous with said first side of said joining structure and with the second side of said extrusion now continuous with said second side of said joining structure, and wherein there is a next subsequent attachment of fluid dynamic structure to said joining structure, with the suction surface of the next subsequently attached fluid dynamic structure now continuous with said first surface of said joining structure, and with the pressure surface of said next subsequently attached fluid dynamic structure now continuous with said second surface of said joining structure.

* * * * *